United States Patent
Kelley et al.

(10) Patent No.: US 8,427,486 B2
(45) Date of Patent: *Apr. 23, 2013

(54) APPLYING NON-HOMOGENEOUS PROPERTIES TO MULTIPLE VIDEO PROCESSING UNITS (VPUS)

(75) Inventors: Timothy M. Kelley, Orlando, FL (US); Jonathan L. Campbell, Orlando, FL (US); David A. Gotwalt, Winter Springs, FL (US)

(73) Assignee: ATI Technologies ULC, Markham, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/241,914

(22) Filed: Sep. 23, 2011

(65) Prior Publication Data

US 2012/0098840 A1   Apr. 26, 2012

Related U.S. Application Data

(63) Continuation of application No. 11/140,163, filed on May 27, 2005, now Pat. No. 8,054,314.

(51) Int. Cl.
   G06F 15/16 (2006.01)
   G06F 15/80 (2006.01)
   G06F 13/14 (2006.01)
   G06T 15/00 (2011.01)

(52) U.S. Cl.
   USPC ............ 345/502; 345/505; 345/520; 345/522

(58) Field of Classification Search ................... 345/502, 345/505, 520, 522
   See application file for complete search history.

(56) References Cited

U.S. PATENT DOCUMENTS

| | | |
|---|---|---|
| 5,361,370 A | 11/1994 | Sprague et al. |
| 5,392,385 A | 2/1995 | Evangelist et al. |
| 5,428,754 A | 6/1995 | Baldwin |
| 5,459,835 A | 10/1995 | Trevett |
| 5,539,898 A | 7/1996 | Trevett |
| 6,191,800 B1 | 2/2001 | Arenburg et al. |
| 6,243,107 B1 | 6/2001 | Valtin |
| 6,359,624 B1 | 3/2002 | Kunimatsu |

(Continued)

FOREIGN PATENT DOCUMENTS

| | | |
|---|---|---|
| EP | 0 712 076 | 5/1996 |
| EP | 1 347 374 | 9/2003 |
| GB | 2 247 596 | 3/1992 |

OTHER PUBLICATIONS

Furber S B, "VLSI RISC Architecture and Organisation", New York, Marcel Dekker, US, 1989, pp. 105-109.

(Continued)

*Primary Examiner* — Chante Harrison
(74) *Attorney, Agent, or Firm* — Volpe and Koenig, P.C.

(57) ABSTRACT

A multiprocessor system includes a plurality of special purpose processors that perform different portions of a related processing task. A set of commands that cause each of the processors to perform the portions of the related task are distributed, and the set of commands includes a predicated execution command that precedes other commands within the set of commands. It is determined whether commands subsequent to the predicated execution command are intended to be executed by a first processor or a second processor based on information in the predicated execution command and the set of commands includes all commands to be executed by each processor.

15 Claims, 21 Drawing Sheets

U.S. PATENT DOCUMENTS

| | | | |
|---|---|---|---|
| 6,377,266 | B1 | 4/2002 | Baldwin |
| 6,476,816 | B1 | 11/2002 | Deming |
| 6,518,971 | B1 | 2/2003 | Pesto, Jr. |
| 6,535,216 | B1 | 3/2003 | Deming |
| 6,642,928 | B1 | 11/2003 | Deming |
| 6,667,744 | B2 | 12/2003 | Buckelew |
| 6,677,952 | B1 | 1/2004 | Baldwin |
| 6,720,975 | B1 | 4/2004 | Dietrich, Jr. |
| 6,816,561 | B1 | 11/2004 | Potter |
| 6,885,376 | B2 | 4/2005 | Tang-Petersen |
| 6,956,579 | B1 | 10/2005 | Diard et al. |
| 7,075,541 | B2 | 7/2006 | Diard |
| 7,525,547 | B1 | 4/2009 | Diard |
| 7,602,395 | B1 | 10/2009 | Diard |
| 2004/0210788 | A1 | 10/2004 | Williams et al. |
| 2005/0012749 | A1 | 1/2005 | Gonzalez et al. |
| 2005/0041031 | A1 | 2/2005 | Diard |
| 2006/0055701 | A1* | 3/2006 | Taylor et al. ............ 345/522 |
| 2006/0114260 | A1* | 6/2006 | Diard ........................ 345/505 |
| 2006/0271717 | A1* | 11/2006 | Koduri et al. ............ 710/241 |
| 2009/0207178 | A1* | 8/2009 | Azar et al. ................ 345/502 |
| 2010/0053177 | A1 | 3/2010 | Diard et al. |
| 2010/0066747 | A1* | 3/2010 | Diard ........................ 345/522 |
| 2011/0102445 | A1* | 5/2011 | Harada et al. ............ 345/536 |
| 2012/0001905 | A1* | 1/2012 | Andonieh et al. ........ 345/419 |

OTHER PUBLICATIONS

Nvidia Corporation, "High Resolution Antialiasing Through Multisampling", Technical Brief, 2002, 9 pages.

Lin, et al., "An Anti-Aliasing Method for Parallel Rendering", Computer Graphics International, 1998, pp. 228-235.

Humphreys, et al., "Chromium: A Stream-Processing Framework for Interactive Rendering on Clusters", ACM Transactions on Graphics ACM USA, vol. 21, No. 3, Jul. 2002, pp. 693-702.

Molnar, et al., "Pixelflow: High Speed Rendering Using Imae Composition", Computer Graphics Proceedings, Annual Conference Series, vol. 26, No. 2, Jul. 1992, pp. 231-237.

Correa, et al., "Out-of-Core Sort-First Parallel Rendering for Cluster-Based Tiled Displays", Parallel Computing, Elsevier Publishers, Amsterdam, NL, vol., 29, No. 3, Mar. 2003, pp. 325-338.

Humphreys, et al., "Wiregl: A Scalable Graphics System for Clusters", Computer Graphics Siggraph 2001, Conference Proceedings, Los Angeles, CA, Aug. 12-17, 2001, pp. 129-140.

Stoll, et al., "Lightening-2: A High Performance Display System for PC Clusters", Computer Graphics Siggraph 2001, Conference Proceedings, Los Angeles, CA, Aug. 12-17, 2001, pp. 141-148.

Nonaka, et al., Hybrid Hardware-Accelerated Image Composition for Sort-Last Parallel Rendering on Graphics Clusters With Commodity Image Compositor, Volume Visualization and Graphics, Oct. 2004, IEEE Symposium, Austin, TX, pp. 17-24.

Eldridge, et al., "Pomergranate: A Fully Scalable Graphic Architechture", Comuter Graphics, Siggraph 2000, Conference Proceedings, New Orleans, LA, Jul. 23-28, pp. 443-454.

Lieserson, et al., "The Network Architecture of the Connection Machine CM-05", SPAA 92 4th Annual ACM Symposium on Parallel Algorithms and Architecture ACEM, New York, NY, 1992, pp. 272-285.

Molnar, et al., "A Sorting Classification of Parallel Rendering", IEEE Computer Graphics and Applications, IEEE Service Center, New York, NY, vol. 14, No. 4, Jul. 1994, pp. 23-32.

Feng, et al., "Extending Open MP for Heterogeneous Chip Multiprocessors", Parellel Processing, 2003 Proceedings, 2003 International Conference Oct. 6-9, Piscataway, NJ, pp. 161-168.

Whitman, Scott, "Dynamic Load Balancing for Parallel Polygon Rendering", IEEE Computer Gaphics and Applications, IEEE Service Center, New York, NY, US, vol. 14, No. 4, Jul. 1, 1994, pp. 41-48.

Yung, N.H.C. et al., "Fast and Parallel Video Encoding by Workload Balancing", Systems, Man and Cybernetics, Oct. 11, 1998, IEEE International Conference on San Diego, CA, vol. 5, pp. 4642-4647.

* cited by examiner

Device A view of Command Sequence

| Attribute C0 | Attribute C1 | PRED_EXEC Passthru (NOP of len 1) | Attribute A0 | Attribute A1 | Attribute A2 | Attribute C2 | NOP of Length LB | ... | Operation OpC0 | Attribute C3 | Operation OpC1 |
|---|---|---|---|---|---|---|---|---|---|---|---|

FIG.6B

Device B view of Command Sequence

| Attribute C0 | Attribute C1 | NOP of Length LA | ... | Attribute C2 | Pred_Exec Pass Thru | Attribute B0 | Attribute B1 | Operation OpB0 | Operation OpC0 | Attribute C3 | Operation OpC1 |
|---|---|---|---|---|---|---|---|---|---|---|---|

FIG.6C

APPLYING NON-HOMOGENEOUS PROPERTIES TO MULTIPLE VIDEO PROCESSING UNITS (VPUS)

CROSS REFERENCE TO RELATED APPLICATION(S)

This application is a continuation of U.S. patent application Ser. No. 11/140,163, filed May 27, 2005, which is incorporated by reference as if fully set forth.

FIELD OF INVENTION

The invention is in the field of graphics and video processing.

BACKGROUND

Graphics and video processing hardware and software continue to become more capable, as well as more accessible, each year. Graphics and video processing circuitry is typically present on an add-on card in a computer system, but is also found on the motherboard itself. The graphics processor is responsible for creating the picture displayed by the monitor. In early text-based personal computers (PCs) this was a relatively simple task. However, the complexity of modern graphics-capable operating systems has dramatically increased the amount of information to be displayed. In fact, it is now impractical for the graphics processing to be handled by the main processor, or central processing unit (CPU) of a system. As a result, the display activity has typically been handed off to increasingly intelligent graphics cards which include specialized coprocessors referred to as graphics processing units (GPUs) or video processing units (VPUs).

In theory, very high quality complex video can be produced by computer systems with known methods. However, as in most computer systems, quality, speed and complexity are limited by cost. For example, cost increases when memory requirements and computational complexity increase. Some systems are created with much higher than normal cost limits, such as display systems for military flight simulators. These systems are often entire one-of-a-kind computer systems produced in very low numbers. However, producing high quality, complex video at acceptable speeds can quickly become prohibitively expensive for even "high-end" consumer-level systems. It is therefore an ongoing challenge to create VPUs and VPU systems that are affordable for mass production, but have ever-improved overall quality and capability.

Another challenge is to create VPUs and VPU systems that can deliver affordable, higher quality video, do not require excessive memory, operate at expected speeds, and are seamlessly compatible with existing computer systems.

SUMMARY

A multiprocessor system includes a plurality of special purpose processors that perform different portions of a related processing task. A set of commands that cause each of the processors to perform the portions of the related task are distributed, and the set of commands includes a predicated execution command that precedes other commands within the set of commands. It is determined whether commands subsequent to the predicated execution command are intended to be executed by a first processor or a second processor based on information in the predicated execution command and the set of commands includes all commands to be executed by each processor.

BRIEF DESCRIPTION OF THE DRAWING(S)

FIG. 6B is a diagram of the command buffer of FIG. 6A as seen by one VPU in a system according to an embodiment.

FIG. 6C is a diagram of the command buffer of FIG. 6A as seen by another VPU in a system according to an embodiment.

DETAILED DESCRIPTION OF THE PREFERRED EMBODIMENT(S)

An improved system and method for video processing is described herein. Embodiments include a video processing system with at least one graphics processing unit (GPU) or video processing unit (VPU). As used herein, GPU and VPU are interchangeable terms. In various embodiments, rendering tasks are shared among the VPUs in parallel to provide improved performance and capability with minimal increased cost. Respective VPUs in the system cooperate to produce a frame to be displayed. In various embodiments, data output by different VPUs in the system is combined, or merged, or composited to produce a frame to be displayed. In one embodiment, the system is programmable such that various modes of operation are selectable, including various compositing modes, and various modes of task sharing or load balancing between multiple VPUs. In load balancing modes, each VPU in the system performs different tasks as part of rendering a same frame, and therefore typically executes different commands. In various embodiments, efficiency of the system is enhanced by forming a single command buffer for execution by all of the VPUs in the system even though each VPU may have a different set of commands to execute in the command buffer. This avoids inefficiencies and overhead associated with forming and managing a separate command buffer for each VPU.

For example, if it was necessary to build two command buffers for each VPU in the system according to traditional methods, the effective available command buffer space would be divided by the number of VPUs. Another disadvantage is that the command buffer usage would also be effectively multiplied by the same number. Embodiments also provide faster performance by reducing the amount of writing by the driver by a factor related to the number of VPUs. Another advantage of the embodiments described is that cache misses will usually be reduced. For example, it is not necessary to switch command buffer for each unique command, as would be the case if the driver were building different command buffers for each VPU. Rather, the driver works continually on one command buffer as if the system had only one VPU.

Figure 1:
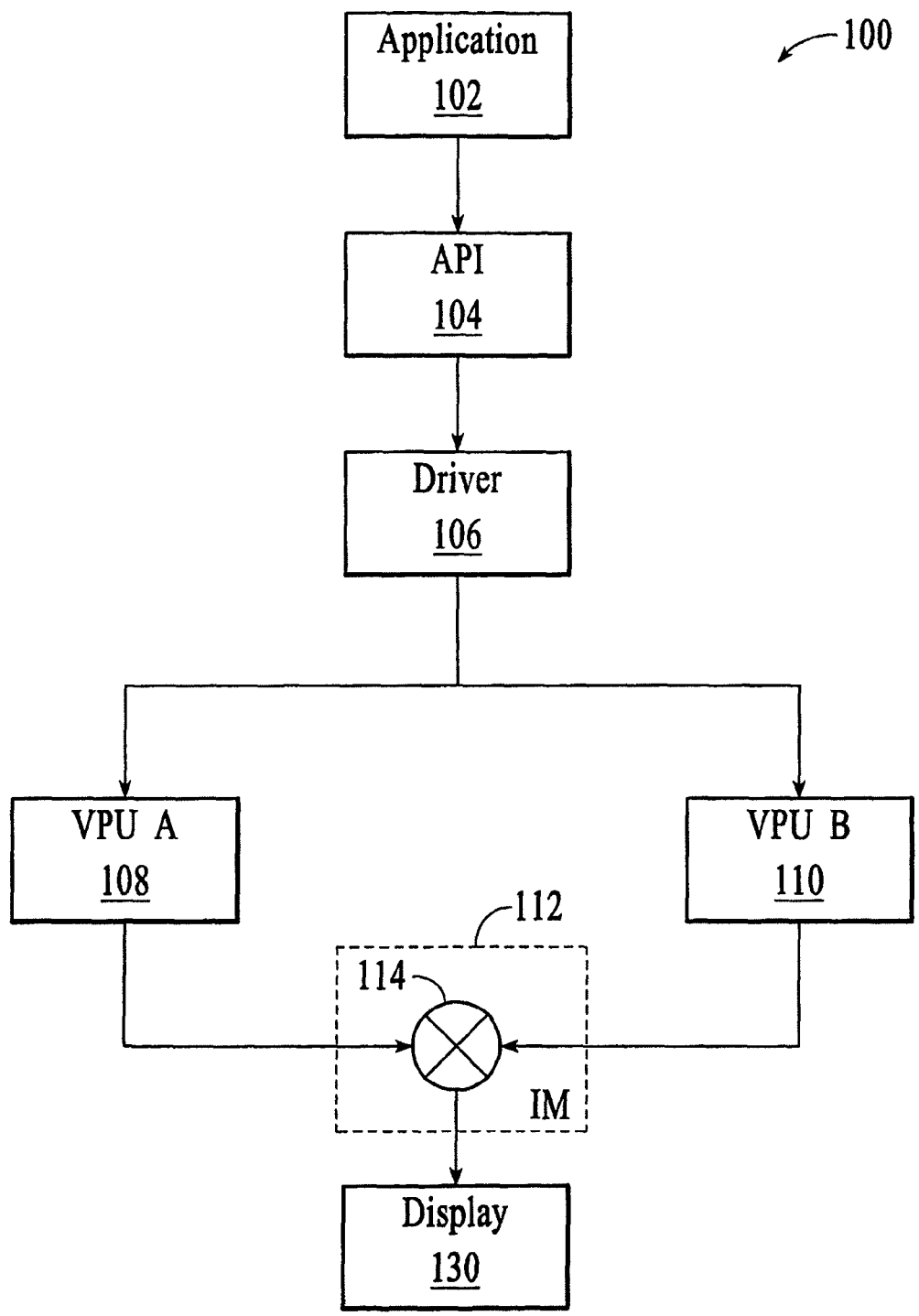
FIG. 1 is a block diagram of a video processing system according to an embodiment.

FIG. 1 is a block diagram of a video processing system 100 according to an embodiment. The system 100 includes an application 102. The application 102 is an end user application that requires video processing capability, such as a video game application. The application 102 communicates with application programming interface (API) 104. Several APIs are available for use in the video processing context. APIs were developed as intermediaries between the application software, such as the application 102, and video hardware on which the application runs. With new chipsets and even entirely new hardware technologies appearing at an increasing rate, it is difficult for applications developers to take into account, and take advantage of, the latest hardware features. It is also becoming impossible to write applications specifically for each foreseeable set of hardware. APIs prevent applications from having to be too hardware specific. The application can output graphics data and commands to the API in a standardized format, rather than directly to the hardware. Examples of available APIs include DirectX (from Microsoft) and OpenGL (from Silicon Graphics).

The API 104 can be any one of the available APIs for running video applications. The API 104 communicates with a driver 106. The driver 106 is typically written by the manufacturer of the video hardware, and translates the standard code received from the API into a native format understood by the hardware. The driver allows input from, for example, an application, process, or user to direct settings. Such settings include settings for selecting modes of operation, including modes of operation for each of multiple VPUs, and modes of compositing frame data from each of multiple VPUs, as described herein. For example, a user can select settings via a user interface (UI), including a UI supplied to the user with video processing hardware and software as described herein.

In one embodiment, the video hardware includes two video processing units, VPU A 108 and VPU B 110. In other embodiments there can be less than two or more than two VPUs. In various embodiments, VPU A 108 and VPU B 110 are identical. In various other embodiments, VPU A 108 and VPU B 110 are not identical. The various embodiments, which include different configurations of a video processing system, will be described in greater detail below.

The driver 106 issues commands to VPU A 108 and VPU B 110. The commands issued to VPU A 108 and VPU B 110 at the same time are for processing the same frame to be displayed. VPU A 108 and VPU B 110 each execute a series of commands for processing the frame. The driver 106 programmably instructs VPU A 108 and VPU B 110 to render frame data according to a variety of modes. For example, the driver 106 programmably instructs VPU A 108 and VPU B 110 to render a particular portion of the frame data. Alternatively, the driver 106 programmably instructs each of VPU A 108 and VPU B 110 to render the same portion of the frame data.

When either of VPU A 108 and VPU B 110 finishes executing the commands for the frame, the frame data is sent to a compositor 114. The compositor 114 is optionally included in an interlink module 112, as described more fully below. VPU A 108 and VPU B 110 cooperate to produce a frame to be displayed. In various embodiments, the frame data from each of VPU A 108 and VPU B 110 is combined, or merged, or composited in the compositor 114 to generate a frame to be rendered to a display 130. As used herein, the terms combine, merge, composite, mix, or interlink all refer to the same capabilities of the IM 112 and/or compositor 114 as described herein.

Figure 2:
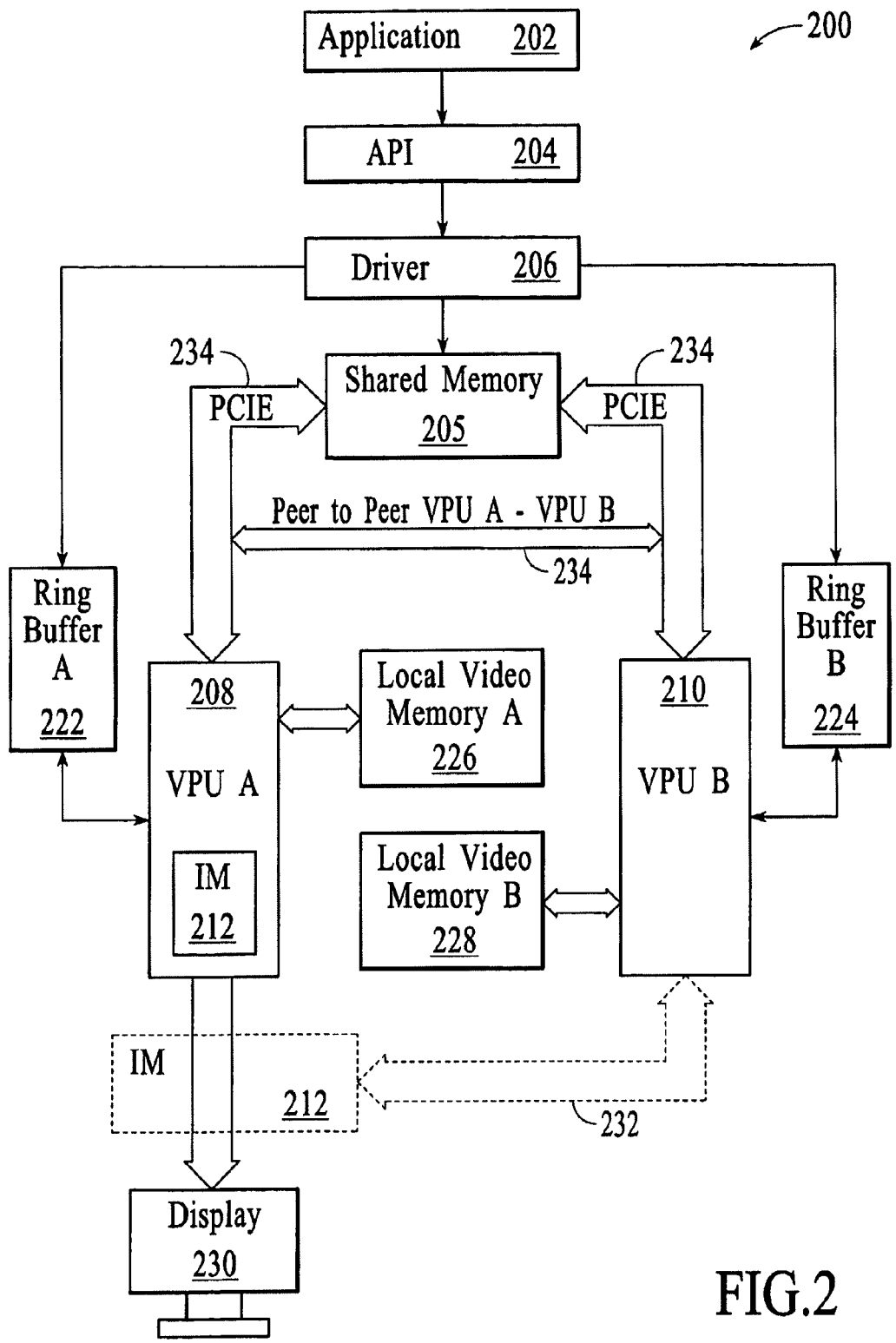
FIG. 2 is a more detailed block diagram of a video processing system according to an embodiment.

FIG. 2 is a block diagram of a system 200 according to an embodiment. The system 200 includes components or elements that may reside on various components of a video-capable computer system. In one embodiment an application 202, a driver 204, and a shared memory 205 reside on a host computer system, while remaining components reside on video-specific components, including one or more video cards, but the invention is not so limited. Any of the components shown could reside anywhere or, alternatively, various components could access other components remotely via a wired or wireless network. The application 202 is an end user application that requires video processing capability, such as a video game application. The application 202 communicates with application programming interface (API) 204. The API 204 can be any one of the available graphics, or video, or 3D APIs including DirectX (from Microsoft) and OpenGL (from Silicon Graphics).

The API 204 communicates with a driver 206. The driver 206 is written specifically for the system 200, and translates the standard code received from the API 204 into a native format understood by the VPU components, which will be explained more fully below.

In one embodiment, the system 200 further includes two VPUs, VPU A 208 and VPU B 210. The invention is not limited to two VPUs. Aspects of the invention as described herein would be workable with one VPU with modifications available to one of ordinary skill in the art. However, in most instances the system would be less efficient with one VPU than with more than one VPU. Various embodiments also include more than two VPUs. Systems with more than two are workable with modifications available to one of ordinary skill in the art, and in most instances would provide better efficiency than a system with two VPUs. In various embodiments VPU A 208 and VPU B 210 can be on one or more video cards that each includes a video processor and other associated hardware. As will be explained further below, the invention is not so limited. For example, more than one VPU can be resident on one card or board. However, as referred to herein a VPU is intended to include at least a video processor.

VPU A 208 and VPU B 210 receive commands and data from the driver 206 through respective ring buffers A 222, and B 224. The commands instruct VPU A 208 and VPU B 210 to perform a variety of operations on the data in order to ultimately produce a rendered frame for a display 230.

The driver 206 has access to a shared memory 205. In one embodiment, the shared memory 205, or system memory 205, is memory on a computer system that is accessible to other components on the computer system bus, but the invention is not so limited.

In one embodiment, the shared memory 205, VPU A 208 and VPU B 210 all have access to a shared communication bus 234, and therefore to components on the bus 234. In one embodiment, the shared communication bus 234 is a peripheral component interface express (PCIE) bus, but the invention is not so limited.

The PCIE bus is specifically described in the following documents, which are incorporated by reference herein in their entirety as is fully set forth:

PCI Express™, Base Specification, Revision 1.1, Mar. 28, 2005;

PCI Express™, Card Electromechanical Specification, Revision 1.1, Mar. 28, 2005;

PCI Express™, Base Specification, Revision 1.a, Apr. 15, 2003; and

PCI Express™, Card Electromechanical Specification, Revision 1.0a, Apr. 15, 2003.

The Copyright for all of the foregoing documents is owned by PCI-SIG.

In one embodiment, VPU A 208 and VPU B 210 communicate directly with each other using a peer-to-peer protocol over the bus 234, but the invention is not so limited. In other embodiments, there may be a direct dedicated communication mechanism between VPU A 208 and VPU B 210.

VPU A 208 and VPU B 210 each have a local video memory 226 and 228, respectively, available. In various embodiments, one of the VPUs functions as a master VPU and the other VPU functions as a slave VPU, but the invention is not so limited. In other embodiments, the multiple VPUs could be peers under central control of another component. In one embodiment, VPU A 208 acts as a master VPU and VPU B 210 acts as a slave VPU.

In one such embodiment, various coordinating and combining functions are performed by an interlink module (IM) 212 that is resident on a same card as VPU A 208. This is shown as IM 212 enclosed with a solid line. In such an embodiment, VPU A 208 and VPU B 210 communicate with each other via the bus 234 for transferring inter-VPU communications (e.g., command and control) and data. For example, when VPU B 210 transfers an output frame to IM 212 on VPU A 208 for compositing (as shown in FIG. 1 for example), the frame is transferred via the bus 234.

In various other embodiments, the IM 212 is not resident on a VPU card, but is an independent component with which both VPU A 208 and VPU B 210 communicate. One such embodiment includes the IM 212 in a "dongle" that is easily connected to VPU A 208 and VPU B 210. This is indicated in the figure by the IM 212 enclosed by the dashed line. In such an embodiment, VPU A 208 and VPU B 210 perform at least some communication through an IM connection 232. For example, VPU A 208 and VPU B 210 can communicate command and control information using the bus 234 and data, such as frame data, via the IM connection 232.

There are many configurations of the system 200 contemplated as different embodiments of the invention. For example, FIGS. 9-14 as described below illustrate just some of these embodiments.

Figure 3:
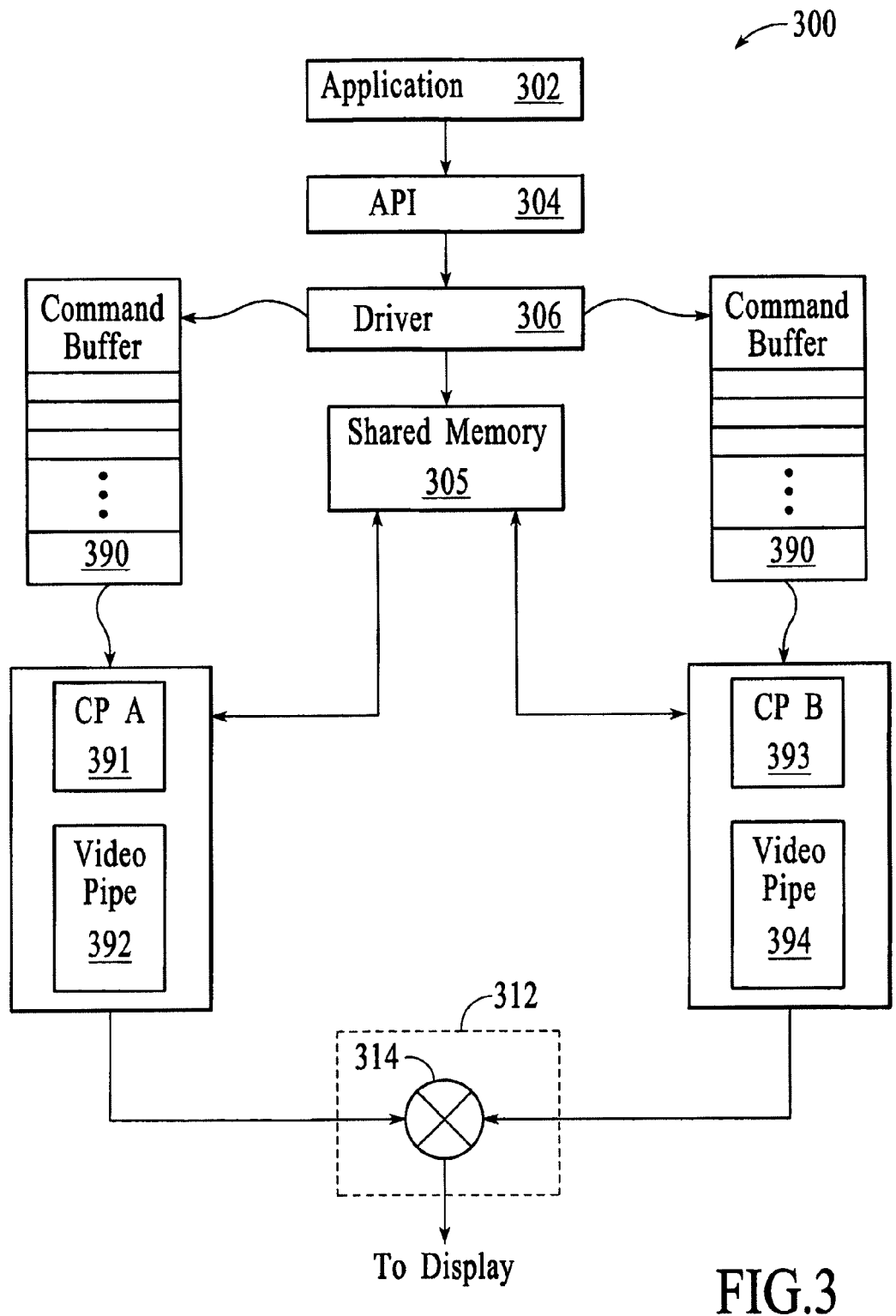
FIG. 3 is a block diagram of various components of a video processing system including applying non-homogeneous properties to multiple video processing units (VPUs) in a multiple VPU system according to an embodiment.

FIG. 3 is a block diagram of a multiple VPU (also referred to as multiVPU) system 300 that is similar to the system 200, but FIG. 3 shows different elements of the system. An application 302, an API 304, and a shared memory 305 all function as previously described with reference to corresponding elements. According to an embodiment, a driver 306 forms or generates or builds a command buffer 390 that is transmitted to each of VPU A 308 and VPU B 310. The embodiment provides an efficient means of providing non-homogeneous properties (e.g., render state, drawing or rendering commands, etc.) to multiple VPUs. The driver 306 can generate one command sequence that consists of general (non-VPU-specific) properties together with properties that are specific to one or more VPUs, and can submit the identical command sequence to multiple VPUs, such as VPU A 308 and VPU B 310. Each VPU properly interprets the general (non-VPU-specific) command sequence. Further, each VPU properly interprets any command sequence that is specific to the VPU and "ignores" all other non-general properties not specific to the VPU. Thus, non-homogeneous properties are applied to multiple video processing units (VPUs) in a multiple VPU system as described further below.

VPU A 308 and VPU B 310 each have respective command processors CP A 391 and CP B 393. CPs 391 and 393 fetch and interpret command sequences in the command buffer 390. Each CP is a combination of dedicated, fixed function hardware for command processing, and software program-based execution. There is a set of microcode for each CP, as well as a small microengine (ME), or execution engine, that executes a sequence of microcode that is preloaded by the driver 306. The microcode determines what code is executed for a command packet (for example, via a jump table based on an OPCODE), and it also includes the sequence of operations or code executed in order to interpret the data in the command. Commands are executed by respective video pipelines 392 and 394 as directed by CPs 391 and 393. In various modes of system operation, the outputs of the VPU A 308 and the VPU B 310 are composited in a compositor 314 as described further herein.

Embodiments as described herein are not limited to a microcode-based processing engine implementation. For example, embodiments also include fixed function logic on silicon.

The microcode is loaded as part of an initialization step of the VPU. Conventionally, for each identical VPU, the same microcode image is loaded. That is, for any two identical VPUs in an identical operating environment, the same microcode image is loaded. In contrast to the conventional practice, embodiments as described herein include loading differing ME microcode images on each VPU in the system 300 that allows each VPU's CP ME to distinguish itself from other VPUs (or groups of VPUs).

An ME has the ability to ignore a programmable number of data elements (e.g., 32-bit DWORDs in a command buffer) by treating these as NOPs (non-operations, or no operation).

In another aspect of the system and method, an algorithm is implemented in the microcode that can determine whether a given command sequence is relevant to the VPU executing the microcode. Further, the algorithm can process the command sequence if it is relevant, or ignore it if it is not relevant. That is, the algorithm provides a means for each VPU's ME to process a command sequence in a predicated manner based on a predication result specific to the VPU.

In yet another aspect of the system and method, an algorithm implemented in the driver allows the construction of a single command sequence consisting of general (non-VPU specific) commands together with commands that are intended to be processed by one or more specific VPUs but not others. That is, an algorithm provides for the driver 306 to construct a predicated command sequence with the predication based on the driver's selection of one or more targeted VPUs.

Various embodiments of a system and method for applying non-homogeneous properties to multiple video processing units (VPUs) in a multiple VPU system are contemplated. Two embodiments will be described in more detail. One of these embodiments will now be described with reference to FIGS. 3-6. The driver 306 builds a command buffer 390 that consists of packets. The packets include commands and/or data information of DWORD granularity. A DWORD is a 32-bit data element.

As the driver 306 builds the command buffer 390, it determines which commands are predicated commands. Just before one or more predicated commands that are intended for one or more specific VPUs, the driver 306 places a specific "predicated execution command". This command is also referred to as the PRED_EXEC command. The PRED_EXEC command includes: a bit field that represents a VPU select; and 2) the length of the predicated command sequence to follow. When the CP A 391 or the CP B 393 encounters the PRED_EXEC, it compares the VPU select in that command with a preprogrammed VPU ID that is unique to the VPU. If the VPU select matches its VPU ID, the VPU will process the commands that follow and execute them. If, however, the VPU select does not match its VPU ID, it "skips" the next N commands, where N is programmed in a packet header. The next N DWORDS of data are ignored. The length is programmed into the packet, so it will ignore the subsequent packet up to the length specified in the PRED_EXEC packet.

In an embodiment, the device ID is present in the specific microcode image that is loaded to each CP, but the invention is not so limited. In other embodiments, the device ID is not used to identify which VPU is to execute the predicated commands. Rather some other data or value could be used to identify which VPU is to execute the predicated commands. The data or value may be stored anywhere in the system 300.

The PRED_EXEC command tells the VPU how many 32 bit data elements (DWORDs) to ignore. This translates into how many commands to ignore in an embodiment in which commands are variable sized, but have a granularity of one DWORD. It is also possible to count commands, for example. However, because the commands are variable of length it may simplify operation of the CP if DWORDs are counted.

TABLE 1

| Ordinal | Field Name | Description |
|---|---|---|
| 1 | [HEADER] | Header field of the packet. |
| 2 | [DEVICE_SELECT \| EXEC_COUNT] | DEVICE_SELECT: [31:24]—bitfield to select one or more devices upon which the subsequent predicated packets will be executed EXEC_COUNT: [22:0]—total number of DWORDs of subsequent predicated packets. This count wraps the packets that will be predicated by the device select. |

The PRED_EXEC packet includes the VPU select (DEVICE_SELECT) and the command length that follows (EXEC_COUNT). The particular VPU select in the packet is compared with the VPU ID of the VPU. If there is a match, then effectively that PRED_EXEC command is terminated, and the subsequent commands are allowed to be executed. If the VPU ID and the VPU select match, then the command length that follows in the PRED_EXEC packet is ignored in the PRED_EXEC packet interpretation by the VPU so that the next DWORD in the command sequence, which is a new command header, is interpreted and executed.

However, if the VPU ID and the VPU select do not match, then the command length provided in the PRED_EXEC packet effectively lengthens the PRED_EXEC packet; it is treated as a NOP, and the number of subsequent DWORDs that is specified in EXEC_COUNT is thrown away. The number corresponds to the number of DWORDs in the subsequent command sequence that is specific to one VPU or another.

In one embodiment in which the device ID is a device mask in the microcode image in the CP, up to eight different devices are supported because there are eight bits in both the device mask microcode image and the DEVICE_SELECT field of the PRED_EXEC packet. The microcode performs a bitwise AND of the DEVICE_SELECT bitfield and the device mask bitfield. If the result of the AND operation is non-zero, the PRED_EXEC packet ends normally to allow the subsequent packets to be executed.

If the result of the AND operation is zero, the microcode loads an ME register with EXEC_COUNT-1. This causes the ME to treat the subsequent packets as part of the current PRED_EXEC packet. The microcode then treats these EXEC_COUNT DWORDs as NOPs.

Figure 4:
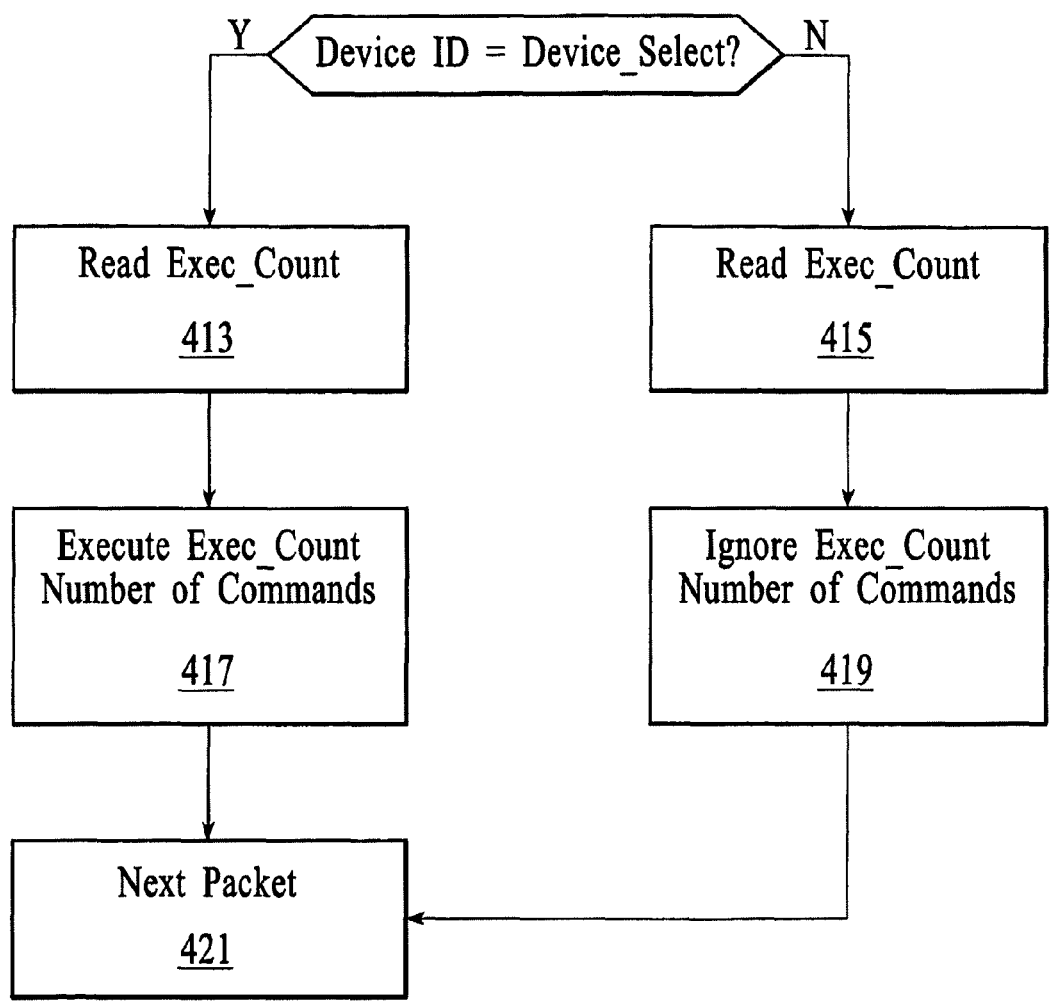
FIG. 4 is flow diagram of a command buffer execution process according to an embodiment.
Figure 5:
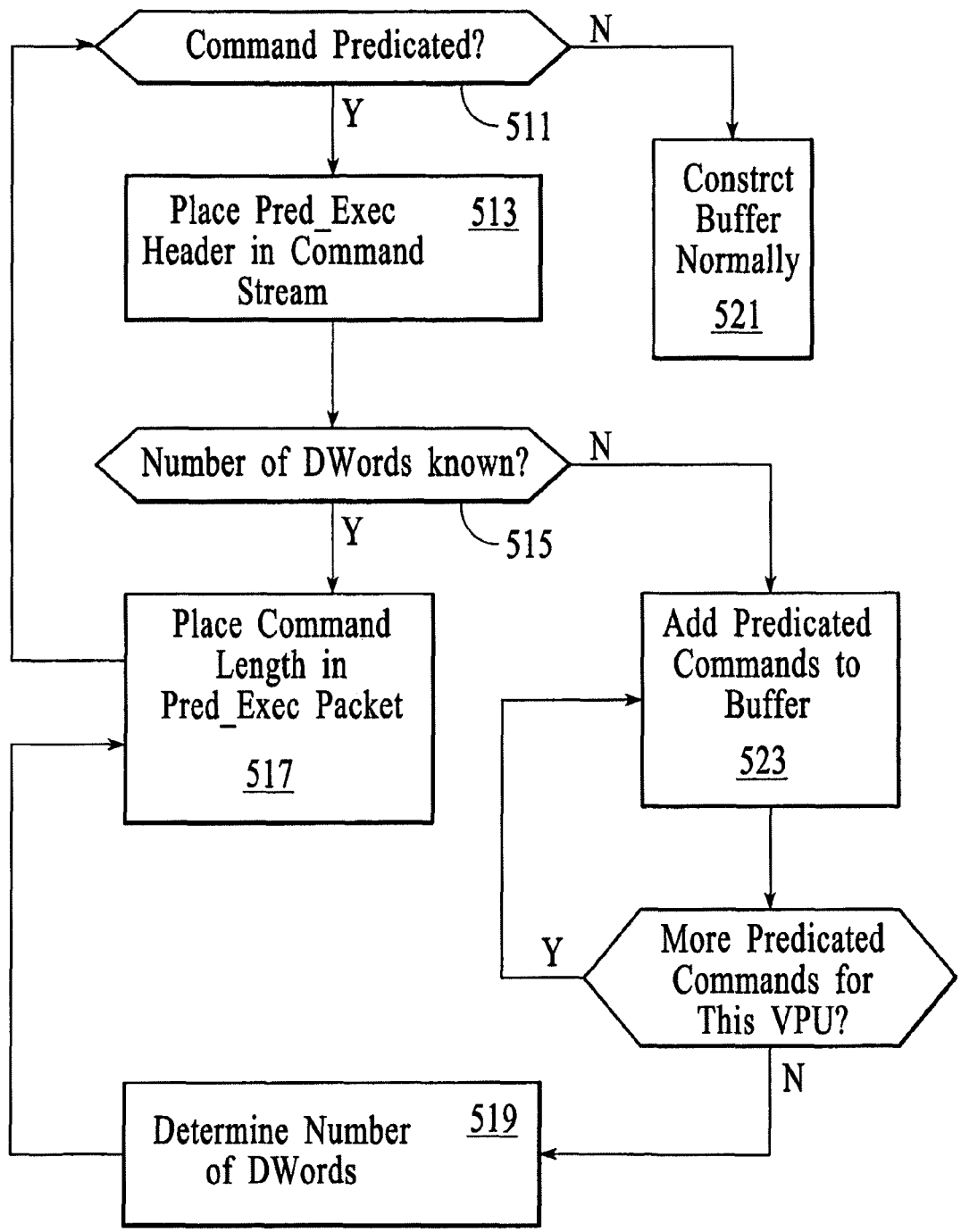
FIG. 5 is a flow diagram of building a command buffer similar to the command buffer executed according to the process of FIG. 4.

FIG. 4 is a flow diagram of execution of a command packet with PRED_EXEC in one VPU according to an embodiment. The device ID of the VPU is compared to the DEVICE_SELECT at 411. If the device ID matches the DEVICE_SELECT, the CP of the VPU reads the EXEC_COUNT at 413. The CP then causes the VPU to execute the number of commands specified by EXEC_COUNT. As previously described this is actually a number of DWORDs in an embodiment. When the specified number of commands has been executed, a next packet is fetched by the CP at 421.

If the device ID does not match the DEVICE_SELECT at 411, the CP of the VPU reads the EXEC_COUNT at 415. The CP then causes the VPU to ignore the number of commands specified by EXEC_COUNT. As previously described this is actually a number of DWORDs in an embodiment. The CP then fetches the next packet at 421.

The driver 306 knows there are several VPUs, and it knows which operations the driver want to execute on each VPU based on a variety of factors. For example, the driver directs load balancing among the VPUs as described herein. When the driver is placing commands in the command buffer sequence that are common to all the VPUs, the driver does not have to do any additional work beyond constructing the command buffer in a normal way. If instead the driver targets a given operation or set of attributes to a particular VPU, the driver builds a command buffer as described now with reference to FIG. 5. If a command is predicated, as indicated at 511, the driver places a PRED_EXEC header into the command stream before the predicated command or commands. In some circumstances the driver knows the number of DWORDs affected by the predication. If, at 515, the number of DWORDs is known, the driver places the command length, as EXEC_COUNT, in the PRED-EXEC packet at 517. If, at 515, the number of DWORDs is not known, the driver continues to add predicated commands to the command stream in the buffer at 523. The driver determines whether there are more predicated commands for a particular VPU at 525. If there are more such commands, the driver continues to add predicated commands to the command stream in the buffer at 523. If there are no more such commands, the driver determines the number of DWORDs involved at 519. Then the driver places the command length, as EXEC_COUNT, in the PRED_EXEC packet at 517. The process returns to 511 to determine whether the next command is predicated, and the process repeats.

There may be multiple sequences within a given command buffer that alternate between common commands, commands distinct to VPU A and commands distinct to VPU B, including both state data and operations like drawing or rendering. When the command buffer is complete, the driver submits this same command buffer to both VPUs (or to each VPU in the system). The driver still tracks when each VPU completes the command buffer. The driver does not need to track two different command buffers for the same set of operations. Rather, the same command buffer causes a different set of behaviors on different VPUs.

The application 302 directs when the command buffers are formed and what is in them. The driver 306 starts building the command buffers based on what is coming from the application 302. The driver 306 can build command buffers ahead of execution. The submission of command buffers is done into a ring buffer (as shown for example, in FIG. 2) so the driver 306 can "get ahead" and submit command buffers to be executed before the previous command buffer is finished being executed.

Figure 6A:
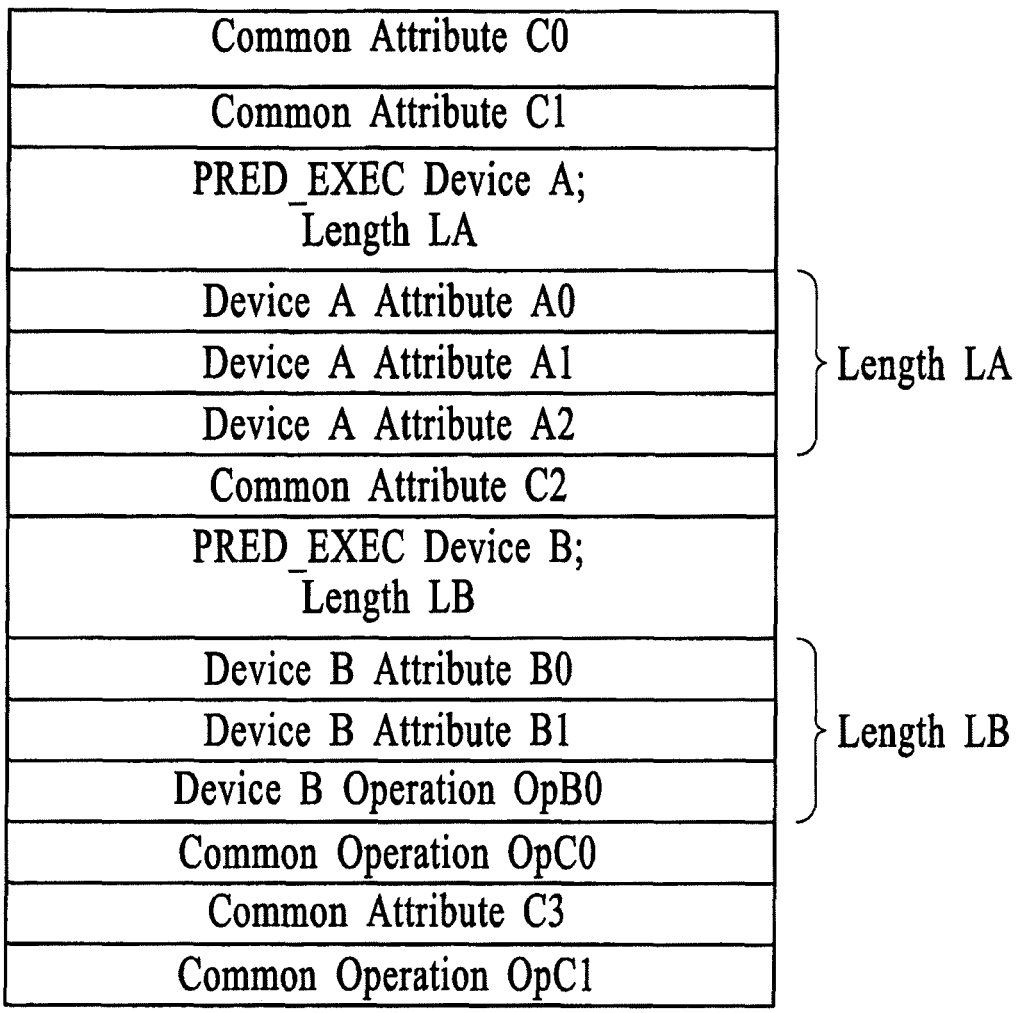
FIG. 6A is a diagram of a command buffer according to an embodiment.

FIG. 6A is a diagram of a command buffer as formed by the driver 306. The command buffer includes common data and predicated data. Two PRED_EXEC packet headers are shown preceding lists of device-specific attributes, including attributes for device A of length LA and attributes for device B of length LB.

FIG. 6B is a diagram showing a device A view of the command sequence of FIG. 6A. FIG. 6C is a diagram showing a device B view of the command sequence of FIG. 6A. Each of devices A and B "see" the predicated commands intended for each other as NOPs. All other commands are seen as executable commands.

Another embodiment will now be described with reference to FIGS. 7 and 8. In this embodiment and variants thereof, a specific predicated packet type is defined for each VPU. The packet is recognized by the VPU for which it is intended. Different microcode is loaded on each VPU to interpret a packet header as preceding either a NOP or a "real operation", such as a register write. Table 2 summarizes two such packets named DEVICE_0_REGISTER_WRITE and DEVICE_1_REGISTER_WRITE.

TABLE 2

| Packet Name | Description |
| --- | --- |
| DEVICE_0_REGISTER_WRITE | Write one or more consecutive registers to device 0. On device 0, the register writes will occur. On device 1, the register writes will be ignored |
| DEVICE_1_REGISTER_WRITE | Write one or more consecutive registers to device 1. On device 1, the register writes will occur. On device 0, the register writes will be ignored |

DEVICE_0_REGISTER_WRITE is interpreted by a device 0 as executable commands, and interpreted by device 1 as NOPs to be ignored. Similarly, DEVICE_1_REGISTER_WRITE is interpreted by a device 1 as executable commands, and interpreted by device 0 as NOPs to be ignored.

Table 3 shows the format for a DEVICE_REGISTER_WRITE packet according to an embodiment.

TABLE 3

| Ordinal | Field Name | Description |
| --- | --- | --- |
| 1 | [HEADER] [#DWORDS] | Header field of the packet. Contains DWORD count. |
| 2 | [BASE_INDEX[12:0]] | Typically, this DWORD is the packet header for the device-specific register write to perform. The BASE_INDEX[12:0] correspond to byte address bits [14:2]. So the BASE_INDEX is the DWORD Memory-mapped address. The BASE_INDEX field width supports up to DWORD address: 0x7FFF. |
| 3 | REG_DATA_1 | The bits correspond to those defined for the relevant register. Note the suffix x of REG_DATA_x stands for an integer ranging from 1 to N. |
| ... | | |
| N + 2 | REG_DATA_N | |

The header includes information that tells how long the packet is (how many DWORDs). The header is followed by a VPU address, or register offset in the hardware, that indicates the first register to write to in that packet. There is then a sequence of one or more DWORDs of data. The first DWORD of the data is written to the base address, or the offset of the register. The next DWORD is written to the next offset register, and so on for as many DWORDs of data as follow.

If the VPU does not "match", then the ME skips up to N+2 DWORDS by "ignoring" them as NOPs.

Figure 7:
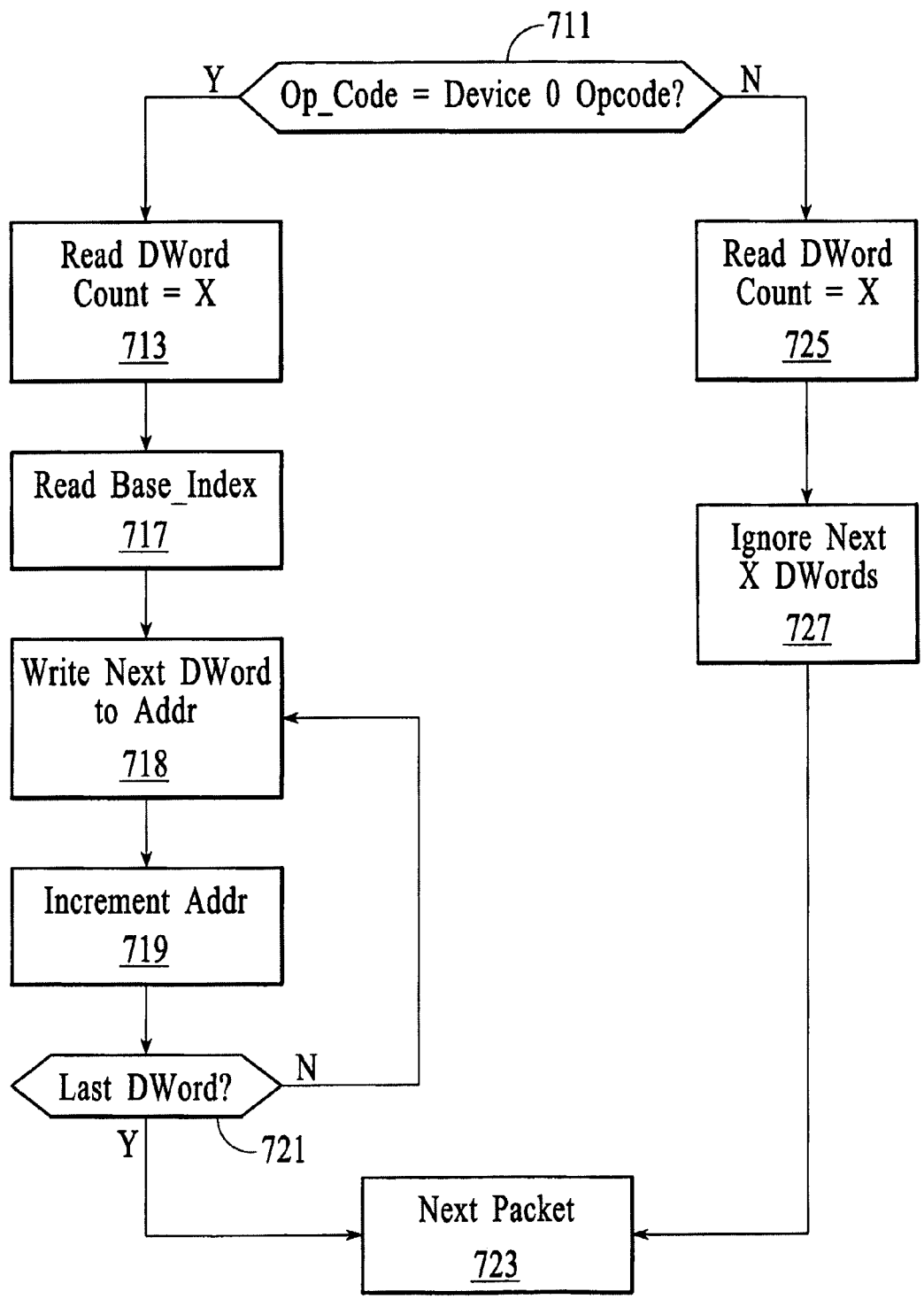
FIG. 7 is flow diagram of a command buffer execution process according to an embodiment.

FIG. 7 is a flow diagram of execution of a DEVICE_REGISTER_WRITE packet according to an embodiment. The flow diagram illustrates a process from the point of view of a VPU that is designated "device 0". At 711, the VPU determines whether the packet OPCODE indicates that the packet is for device 0. If the OPCODE indicates that the packet is for device 0, the DWORD count is read at 713. The BASE_INDEX is read at 717 to determine where to write a first DWORD of data. The next DWORD in the packet is written to the current address at 718. For the first write operation, the current address is indicated by BASE_INDEX. The write address is then incremented at 719 as previously described. If the DWORD written was the last DWORD to be written as determined at 721 from the DWORD count that was read at 713, the device fetches the next packet at 723. If the DWORD written was not the last DWORD to be written, then the next DWORD is written to the current address at 718.

If the device determines from the OPCODE at 711 that the packet was not for device 0, the DWORD count is read at 725. Assuming the DWORD count=X, the next X DWORDS are ignored by the device, and the next packet is fetched at 723.

Figure 8:
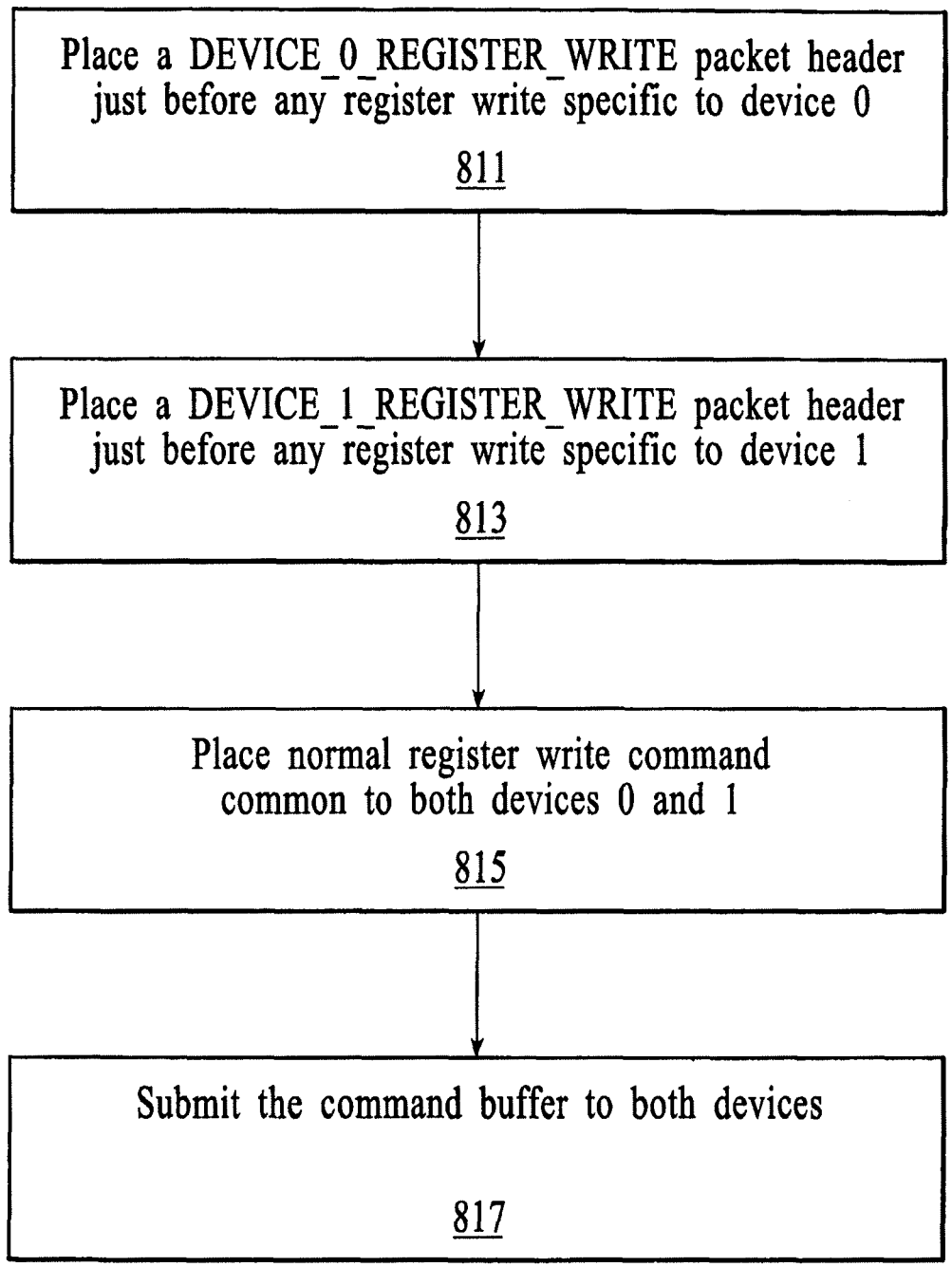
FIG. 8 is a flow diagram of building a command buffer similar to the command buffer executed according to the process of FIG. 7

FIG. 8 is a flow diagram of building a command buffer for execution according to the process of FIG. 7. At 811, a DEVICE_0_REGISTER_WRITE packet header is placed just before any register write specific to device 0. At 813, a DEVICE_1_REGISTER_WRITE packet header is placed just before any register write specific to device 1. At 815, normal register write packets are placed for any register write common to both devices 0 and 1. The common command buffer is submitted to both devices at 817. In FIG. 8, the order of operations shown is not limiting. The operations designated by reference numbers 811, 813, and 815 can occur in any order, and can occur multiple times in the process of building one command buffer. In addition, the number of devices need not be two, but could be greater than two in other embodiments.

Figure 9:
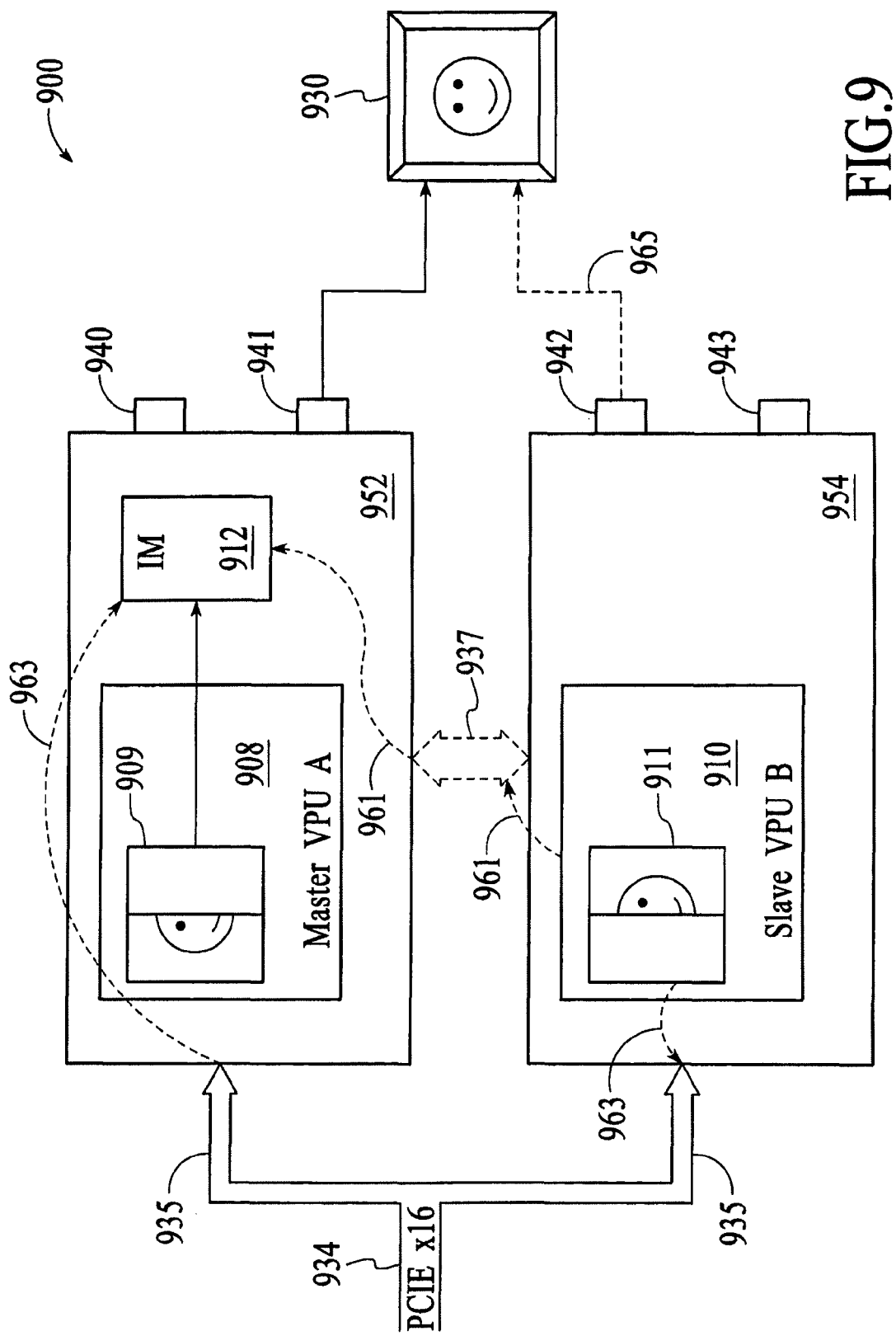
FIG. 9 is a block diagram of various components of a video processing system according to an embodiment.

FIG. 9 is a block diagram of various components of a system 900 according to an embodiment. The system 900 includes a master VPU card 952 and a slave VPU card 954. The master VPU card 952 includes a master VPU 908, and the slave VPU card 954 includes a slave VPU B 910. In one embodiment, VPUs 908 and 910 each communicate via a PICE bus 934. In one embodiment, the PCIE bus 934 is a X16 bus that is split into two X8 PCIE buses 935. Each of the VPUs A 908 and B 910 is connected to a bus 935. In one embodiment, VPU A 908 and VPU B 910 communicate only through the bus 935. In alternative embodiments, VPU A 908 and VPU B 910 communicate partially through bus 935 and partially through dedicated intercard connection 937. In yet other embodiments, VPU A 908 and VPU B 910 communicate exclusively through the connection 937.

The master VPU card 952 includes an IM 1512. In an embodiment in which VPU A 908 and VPU B 910 communicate via the bus 935, each VPU processes frame data as instructed by the driver. As an example in FIG. 9, the system 900 is performing video processing in a "scissoring" load balancing mode as described below. Master VPU A 908 generates an output 909 and slave VPU B 910 generates an output 911. The outputs 909 and 911 are input to the IM 912 for compositing, as described further below. In one embodiment, the slave VPU B 910 transfers its output 911 to the IM 912 via the buses 935 and 934 as shown by the dotted path 963. In one embodiment, the slave VPU B 910 transfers its output 911 to the IM 912 via the dedicated intercard connection 937 as shown by the dotted path 961. The IM 912 combines the outputs 909 and 911 to produce a frame for display. This frame is output to a display 930 by the IM 912 via a connector 941.

The master VPU card 952 includes connectors 940 and 941. The slave VPU card 954 includes connectors 942 and 943. Connectors 940, 941, 942 and 943 are connectors appropriate for the purpose of transmitting the required signals as known in the art. For example, the connector 941 is a digital video in (DVI) connector in one embodiment. There could be more or less than the number of connectors shown in the 00 900.

In one embodiment, the various configurations described herein are configurable by a user to employ any number of available VPUs for video processing. For example, the system 900 includes two VPUs, but the user could choose to use only one VPU in a pass-through mode. In such a configuration, one of the VPUs would be active and one would not. In such a configuration, the task sharing or load balancing as described herein would not be available. However, the enabled VPU could perform conventional video processing. The dotted path 965 from VPU card B 954 to the display 930 indicates that slave VPU B 910 can be used alone for video processing in a pass-through mode. Similarly, the master VPU A 908 can be used alone for video processing in a pass-through mode.

Figure 10:
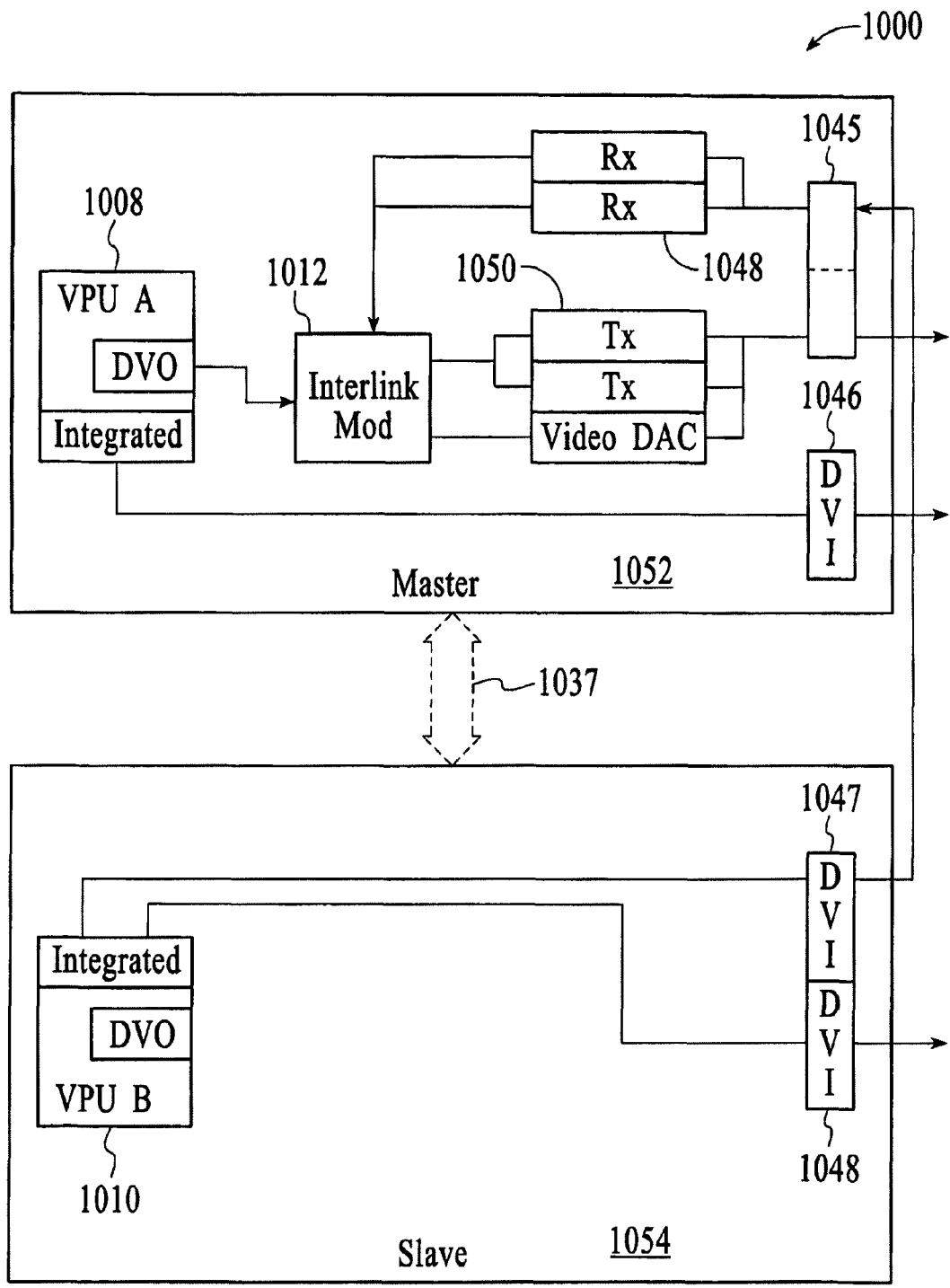
FIG. 10 is a more detailed block diagram of a video processing system, which is a configuration similar to that of FIG. 8 according to an embodiment.

FIG. 10 is a more detailed block diagram of a system 1000, which is a configuration similar to that of FIG. 9 according to an embodiment. The system 1000 includes two VPU cards, a master VPU card 1052 and a slave VPU card 1054. The master VPU card 1052 includes a master VPU A 1008, and the slave VPU card 1054 includes a slave VPU B 1010.

The master VPU card 1052 also includes a receiver 1048 and a transmitter 1050 for receiving and transmitting, in one embodiment, TDMS signals. A dual connector 1045 is a DMS connector in an embodiment. The master card further includes a DVI connector 1046 for outputting digital video signals, including frame data, to a display. The master VPU card 1052 further includes a video digital to analog converter (DAC). An interlink module (IM) 1012 is connected between the VPU A 1008 and the receivers and transmitters as shown. The VPU A 1008 includes an integrated transceiver (labeled "integrated") and a digital video out (DVO) connector.

The slave VPU card 1054 includes two DVI connectors 1047 and 1048. The slave VPU B 1010 includes a DVO connector and an integrated transceiver. As an alternative embodiment to communication over a PCIE bus (not shown), the master VPU card 1052 and the slave VPU card 1054 communicate via a dedicated intercard connection 1037.

Figure 11:
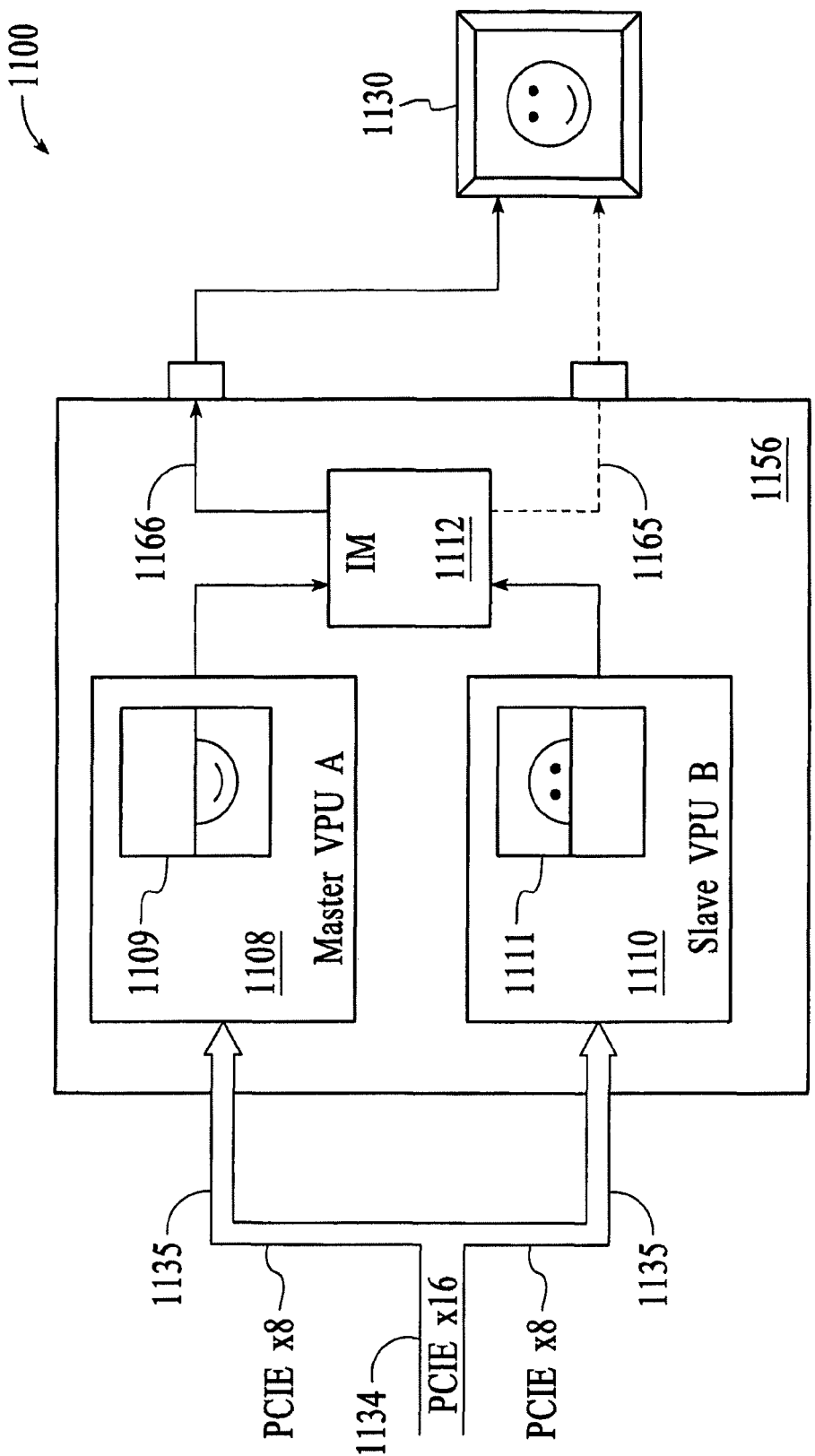
FIG. 11 is a diagram of a one-card video processing system according to an embodiment.

FIGS. 11-14 are diagrams of further embodiments of system configurations. FIG. 11 is a diagram of a one-card system 1100 according to an embodiment. The system 1100 includes a "supercard" or "monstercard" 1156 that includes more than one VPU. In one embodiment, the supercard 1156 includes two VPUs, a master VPU A 1108 and a slave VPU B 1110. The supercard 1156 further includes an IM 1112 that includes a compositor for combining or compositing data from both VPUs as further described below. It is also possible, in other embodiments, to have a dedicated on-card inter-VPU connection for inter-VPU communication (not shown). In one embodiment, the master VPU A 1108 and the slave VPU B 1110 are each connected to an X8 PCIE bus 1135 which comes from a X16 PCIE bus 1134.

The system 1100 includes all of the multiple VPU (also referred to as multiVPU) functionality described herein. For example, the master VPU A 1108 processes frame data as instructed by the driver, and outputs processed frame data 1109 to the IM 1112. The slave VPU B 1110 processes frame data as instructed by the driver, and outputs processed frame data 1111, which is transferred to the IM 1112 for combining or compositing. The transfer is performed via the PCIE bus 1134 or via a dedicated inter-VPU connection (not shown), as previously described with reference to FIG. 900. In either case, the composited frame is output from the IM 1112 to a display 1130.

It is also possible to disable the multiVPU capabilities and use one of the VPUs in a pass-through mode to perform video processing alone. This is shown for example by the dashed path 1165 which illustrates the slave VPU B 1110 connected to a display 1130 to output frame data for display. The master VPU A 1108 can also operate alone in pass-through mode by outputting frame data on path 1166.

Figure 12:
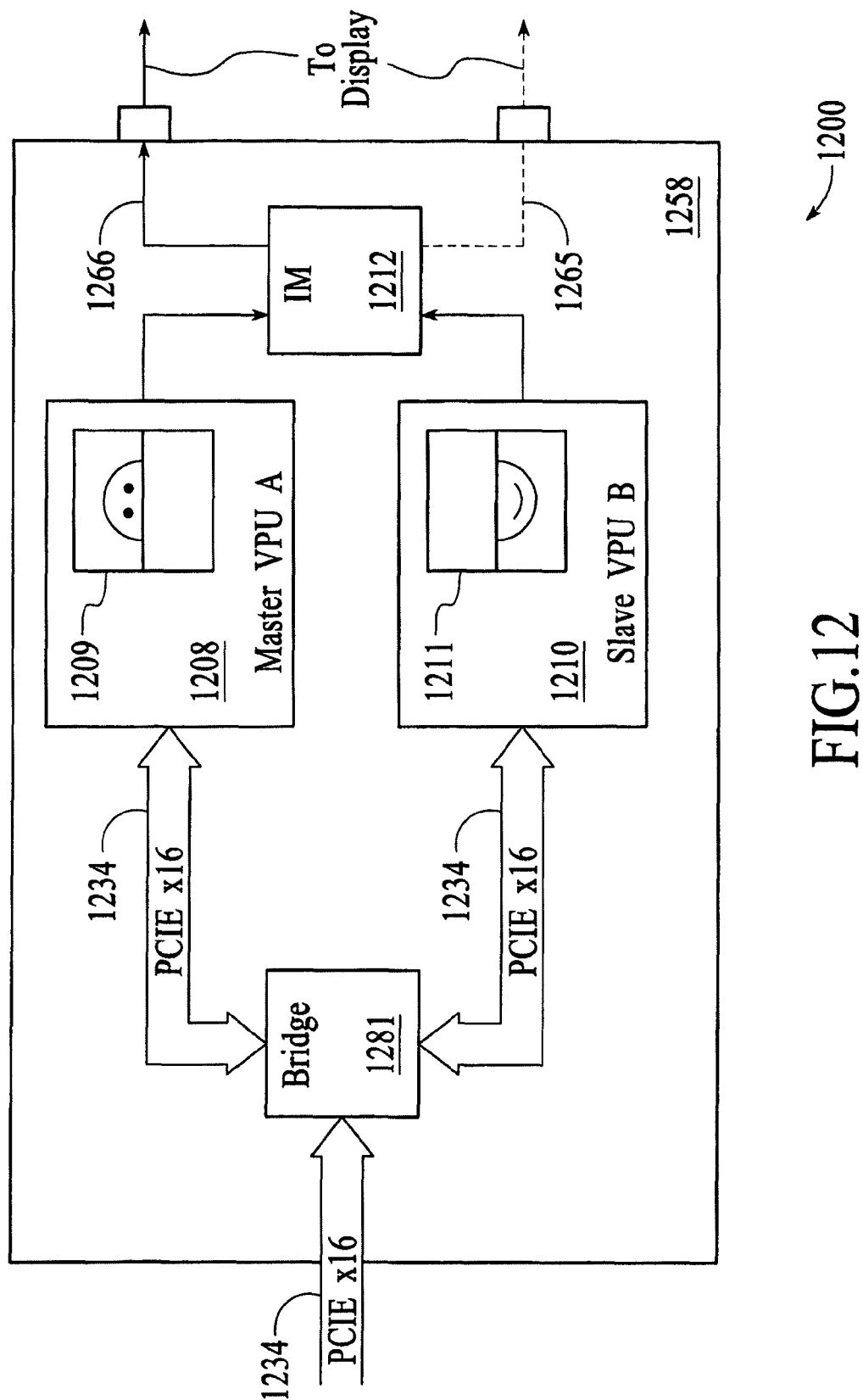
FIG. 12 is a diagram of a one-card video processing system according to an embodiment.

FIG. 12 is a diagram of a one-card system 1200 according to an embodiment. The system 1200 includes a "supercard" or "monstercard" 1258 that includes more than one VPU. In one embodiment, the supercard 1258 includes two VPUs, a master VPU A 1208 and a slave VPU B 1210. The supercard 1258 further includes an IM 1212 that includes a compositor for combining or compositing data from both VPUs as described herein. It is also possible, in other embodiments, to have a dedicated on-card inter-VPU connection for inter-VPU communication (not shown). In one embodiment, the master VPU A 1208 and the slave VPU B 1210 are each connected to a X 16 PCIE bus 1234 through an on-card bridge 1281.

The system 1200 includes all of the multiVPU functionality described herein. For example, the master VPU A 1208 processes frame data as instructed by the driver, and outputs processed frame data 1209 to the IM 1212. The slave VPU B 1210 processes frame data as instructed by the driver, and outputs processed frame data 1211, which is transferred to the IM 1212 for combining or compositing. The transfer is performed via the PCIE bus 1234 or via a dedicated inter-VPU connection (not shown), as previously described with reference to FIG. 900. In either case, the composited frame is output from the IM 1212 to a display (not shown).

It is also possible to disable the multiVPU capabilities and use one of the VPUs in a pass-through mode to perform video processing alone. This is shown for example by the dashed path 1265 which illustrates the slave VPU B 1210 connected to an output for transferring a frame for display. The master VPU A 1208 can also operate alone in pass-through mode by outputting frame data on path 1266.

Figure 13:
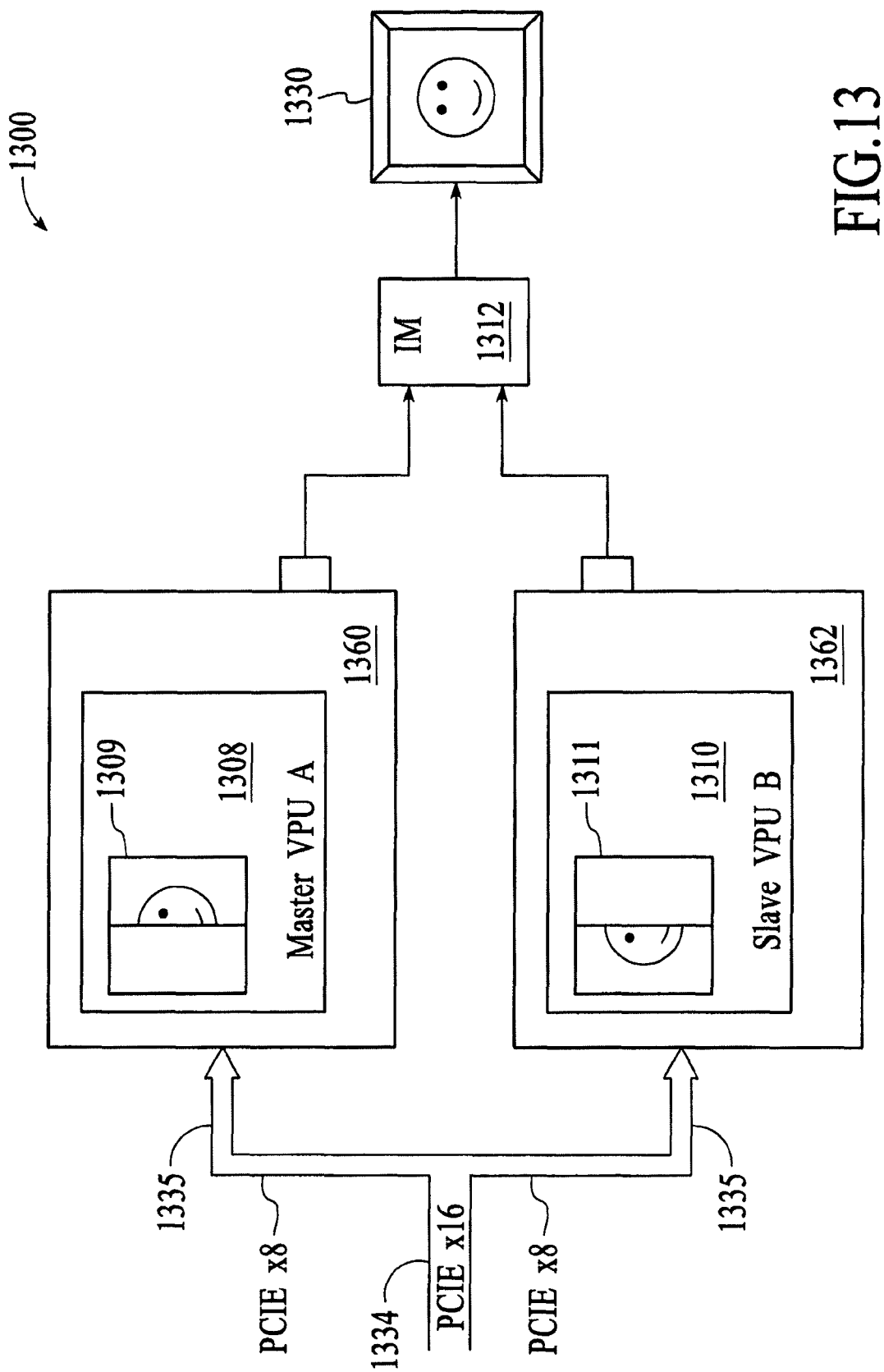
FIG. 13 is a diagram of a two-card video processing system according to an embodiment.

FIG. 13 is a diagram of a two-card system 1300 according to an embodiment. The system 1300 includes two peer VPU cards 1360 and 1362. VPU card 1360 includes a VPU A 1308, and VPU card 1362 includes a VPU 1310. In one embodiment, VPU A 1308 and VPU 1310 are identical. In other embodiments VPU A 1308 and VPU B 1310 are not identical. VPU A 1308 and VPU 1310 are each connected to an X8 PCIE bus 1335 that is split from a X16 PCIE bus 1334. VPU A 1308 and VPU 1310 are further each connected to output data through a card connector to an interlink module (IM) 1312. In one embodiment, the IM 1312 is an integrated circuit in a "dongle" that is easily connectable to VPU card 1360 and VPU card 1362. In one embodiment, the IM 1312 is an integrated circuit specifically designed to include all of the compositing functionality described herein. The IM 1312 merges or composites the frame data output by VPU A 1308 and VPU 1310 and outputs a displayable composited frame to a display 1330.

Figure 14:
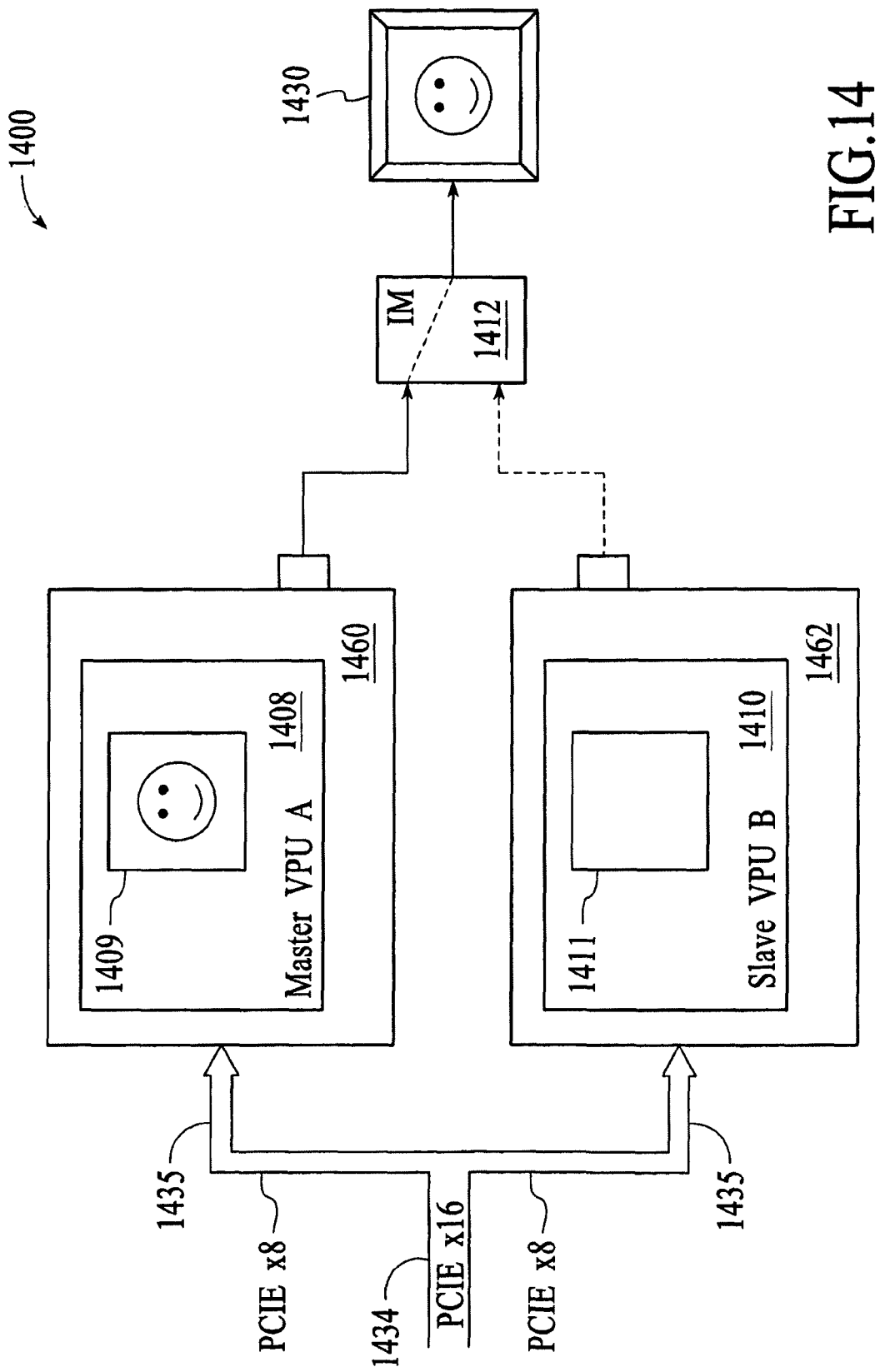
FIG. 14 is a diagram of a two-card video processing system according to an embodiment.

FIG. 14 is a diagram of a two-card system 1400 according to an embodiment. The system 1400 is similar to the system 1300, but is configured to operate in a by-pass mode. The system 1400 includes two peer VPU cards 1460 and 1462. VPU card 1460 includes a VPU A 1408, and VPU card 1462 includes a VPU B 1410. In one embodiment, VPU A 1408 and VPU 1410 are identical. In other embodiments VPU A 1408 and VPU B 1410 are not identical. VPU A 1408 and VPU B 1410 are each connected to an X8 PCIE bus 1435 that is split from a X16 PCIE bus 1434. VPU A 1408 and VPU 1410 are further each connected through a card connector to output data to an interlink module (IM) 1412. In one embodiment, the IM 1412 is an integrated circuit in a "dongle" that is easily connectable to VPU card 1460 and VPU card 1462. In one embodiment, the IM 1412 is an integrated circuit specifically designed to include all of the compositing functionality described herein. The IM 1412 is further configurable to operate in a pass-through mode in which one of the VPUs operates alone and the other VPU is not enabled. In such a configuration, the compositing as described herein would not be available. However, the enabled VPU could perform conventional video processing. In FIG. 14, VPU A 1408 is enabled and VPU B 1410 is disabled, but either VPU can operate in by-pass mode to output to a display 1430.

The configurations as shown herein, for example in FIGS. 9-14, are intended as non-limiting examples of possible embodiments. Other configurations are within the scope of the invention as defined by the claims. For example, other embodiments include a first VPU installed on or incorporated in a computing device, such as a personal computer (PC), a notebook computer, a personal digital assistant (PDA), a TV, a game console, a handheld device, etc. The first VPU can be an integrated VPU (also known as an integrated graphics processor, or IGP), or a non-integrated VPU. A second VPU is installed in or incorporated in a docking station or external enclosed unit. The second VPU can be an integrated VPU or a non-integrated VPU.

In one embodiment, the docking station is dedicated to supporting the second VPU. The second VPU and the first VPU communicate as described herein to cooperatively perform video processing and produce an output as described. However, in such an embodiment, the second VPU and the first VPU communicate via a cable or cables, or another mechanism that is easy to attach and detach. Such an embodiment is especially useful for allowing computing devices which may be physically small and have limited video processing capability to significantly enhance that capability through cooperating with another VPU.

It will be appreciated by those of ordinary skill in the art that further alternative embodiments could include multiple VPUs on a single die (e.g., two VPUs on a single die) or multiple cores on a single silicon chip.

Figure 15:
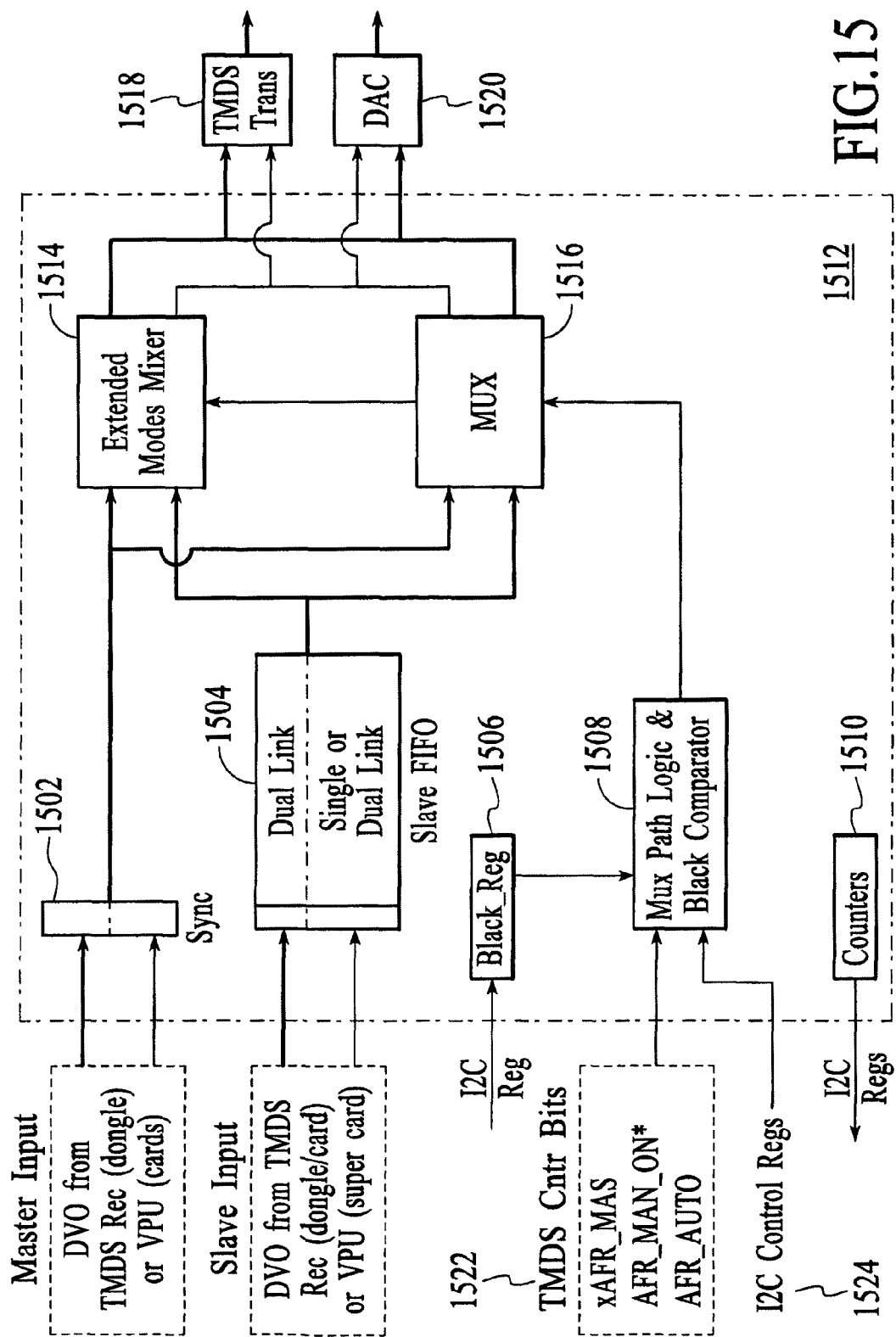
FIG. 15 is a block diagram of an interlink module (IM) according to an embodiment.

FIG. 15 is a block diagram of an interlink module (IM) 1512 according to an embodiment. All rendering commands are fetched by each VPU in the system. In any one of the multiVPU configurations described herein, after the VPUs execute the fetched commands, the IM 1512 merges the streams of pixels and control lines from the multiple VPUs and outputs a single digital video output (DVO) stream.

The IM 1512 includes a master input port that receives a DVO stream from a master VPU. The master VPU input can be from a TDMS receiver in a "dongle" configuration such as those shown in FIGS. 13 and 14. The master VPU input can alternatively come from a master VPU on a master VPU card in a multi-card configuration, as shown for example in FIGS. 9 and 10. A synchronization register 1502 receives the DVO data from the master VPU.

The IM 1512 further includes a slave input port that receives a DVO stream from a slave VPU. The slave VPU input can be from a TDMS receiver in a "dongle" configuration such as those shown in FIGS. 13 and 14 or a card configuration as in FIGS. 9 and 10. The slave VPU input can alternatively come from a slave VPU on a "super" VPU card configuration, as shown for example in FIGS. 11 and 12. The IM 1512 includes FIFOs 1504 on the slave port to help synchronize the input streams between the master VPU and the slave VPU.

The input data from both the master VPU and the slave VPU are transferred to an extended modes mixer 1514 and to a multiplexer (MUX) 1516. The IM 1512 is configurable to operate in multiple compositing modes, as described herein. When the parts of the frame processed by both VPUs are combined, either by the extended modes mixer 1514, or by selecting only non-black pixels for display, as further described below, the entire frame is ready to be displayed.

Control logic determined which compositing mode the IM 1512 operates in. Depending on the compositing mode, either the extended modes mixer or the MUX will output the final data. When the MUX is used, control logic, including a black register 1506 and a MUX path logic and black comparator 1508, determines which pixel (master or slave) is passed through the MUX. Data is output to a TDMS transmitter 1518 or a DAC 1520.

The black register is used to allow for software to set a final black value that has been gamma adjusted.

In one embodiment, the inter-component communication among the VPUs and the IM 1512 includes I2C buses and protocols.

Operating modes, including compositing modes, are set through a combination of I2C register bits 1524 and TMDS control bits 1522 as shown in Table 4.

TABLE 4

Operational Modes and Control Bits

| Category Main | Sub | I2C Bits | TMDS Cntr Bits | Notes |
|---|---|---|---|---|
| Passthru | Slave | INTERLINK_ENABLE = 0 CONTROL_BITS_2: Bit 3 = x | n/a | Uses $1^{st}$ I2C access to determine path |
| Passthru | Master | INTERLINK_ENABLE = 0 CONTROL_BITS_2: Bit 3 = x | n/a | Uses $1^{st}$ I2C access to determine path |
| Interlink | AFR_MANUAL | INTERLINK_ENABLE = 1 CONTROL_BITS_2: Bit 3 = 0 | AFR_MAN_ON* = 0 AFR_AUTO* = 1 | xAFR_MAS state changes controls the next data path |
| Interlink | AFR_AUTO | INTERLINK_ENABLE = 1 CONTROL_BITS_2: Bit 3 = 0 | AFR_MAN_ON* = 0 AFR_AUTO* = 0 | |
| Interlink | BLACKING | INTERLINK_ENABLE = 1 CONTROL_BITS_2: Bit 3 = 0 | AFR_MAN_ON* = 1 AFR_AUTO* = x | Uses black pixels to determine data path |
| Interlink | Super AA | INTERLINK_ENABLE = x CONTROL_BITS_2: Bit 3 = 1 | n/a | CONTROL_BITS_2: Bit 4-7 determines extended mode |

There are two separate data paths through the IM 1512 according to an embodiment. The two input pixel streams from the respective VPUs are either processed through the MUX 1516 (in pass-through mode, or "standard" interlink modes), or through the mixer 1514 in extended modes. In one embodiment, the extended modes include a super antialiasing mode, or "SuperAA mode", as described in copending U.S. patent application Ser. No. Not Yet Assigned, titled "Antialiasing System and Method", which is hereby incorporated by reference in its entirety.

In the MUX 1516, just one pixel from either VPU A or VPU B is selected to pass through, and no processing of pixels is involved. In the extended modes mixer 1514, processing is done on a pixel by pixel basis. In the SuperAA mode, for example, the pixels are processed, averaged together, and reprocessed. In one embodiment, the processing steps involve using one or more lookup tables to generate intermediate or final results.

The selection between the MUX 1516 path and the mixer 1514 path is determined by I2C register bits and control bits. For example, the mixer 1514 path is selected if:
 ENABLE_INTERLINK=1 (I2C register)
 and CONTROL_BITS_2: Bit 3 and Bit 4=1 (Extended-Modes and SuperAA) (else MUX).

In one embodiment, the IM has three ports, two input ports and one output port.

The output port configuration is split into two parts. The DAC is driven across a 24 bit single data rate (SDR) interface. The TMDS is driven with a double data rate (DDR) interface; a 12 pin interface for TMDS single link, and a 24 pin interface for TMDS dual link. The I2C control bit registers determines this configuration.

There are three primary pixel clock domains. Both the master and slave inputs come in on their own separate domains. The IM uses the DVO clock domain for all internal paths and the final output. The DVO clock is generated by the active input port in pass-through mode and from the master input clock in interlink mode.

The master input bus (data and control) goes through a synchronizer as it passes into the DVO clock domain, imparting a 2-4 clock delay. The slave input bus (data and control) goes into a FIFO which is synchronized on its output to the DVO clock domain. The outputs of both paths are routed to a MUX or extended modes mixer, which then outputs a single bus width data output.

In slave pass-through mode the slave FIFO is set into pass-through mode, while in interlink mode, it is used as a standard FIFO. For slave pass-through mode, the control bits go through the FIFO with the pixel data. In interlink mode, sAFR.sub.'MAS goes through with the data, and the control bits are ignored from the slave input port.

I/Os that use DDR clocking are split into double wide buses (e.g., 12-bit DDR input becomes 24 bits internally). This is to avoid having to run the full clock speed through the IM.

In one embodiment, there is one FIFO on the IM, located on the slave channel. 24 bits of pixel data flow through the FIFO in single TMDS mode, and 48 bits of data flow through the FIFO in dual TMDS mode. The slave port's control bits are also carried through this FIFO when in pass-through mode, slave path. When in interlink mode, the control bits are ignored, and instead of the control bits the sAFR_MAS bit is carried through in parallel with the pixel data.

When in single link TMDS mode (CONTROL_BITS: Dual_Link_Mode bit=0), the extra 24 bits of data for dual link are not clocked to conserve power.

On power up the FIFOs should be set to empty. FIFOs are also cleared when the ENABLE_INTERLINK bit toggles to 1 or if the CONTROL_ONESHOTS: FIFO_Clear bit is set to 1.

The slave FIFO has two watermarks (registers FIFO_FILL, FIFO_STOP). The IM drives the SlavePixelHold pin depending on how full the FIFO is and the values in these registers. If the slave FIFO has FIFO_FILL or fewer entries in use, the SlavePixelHold should go low. If the slave FIFO has FIFO_STOP or more entries in use, the SlavePixelHold should go high.

Figure 16:
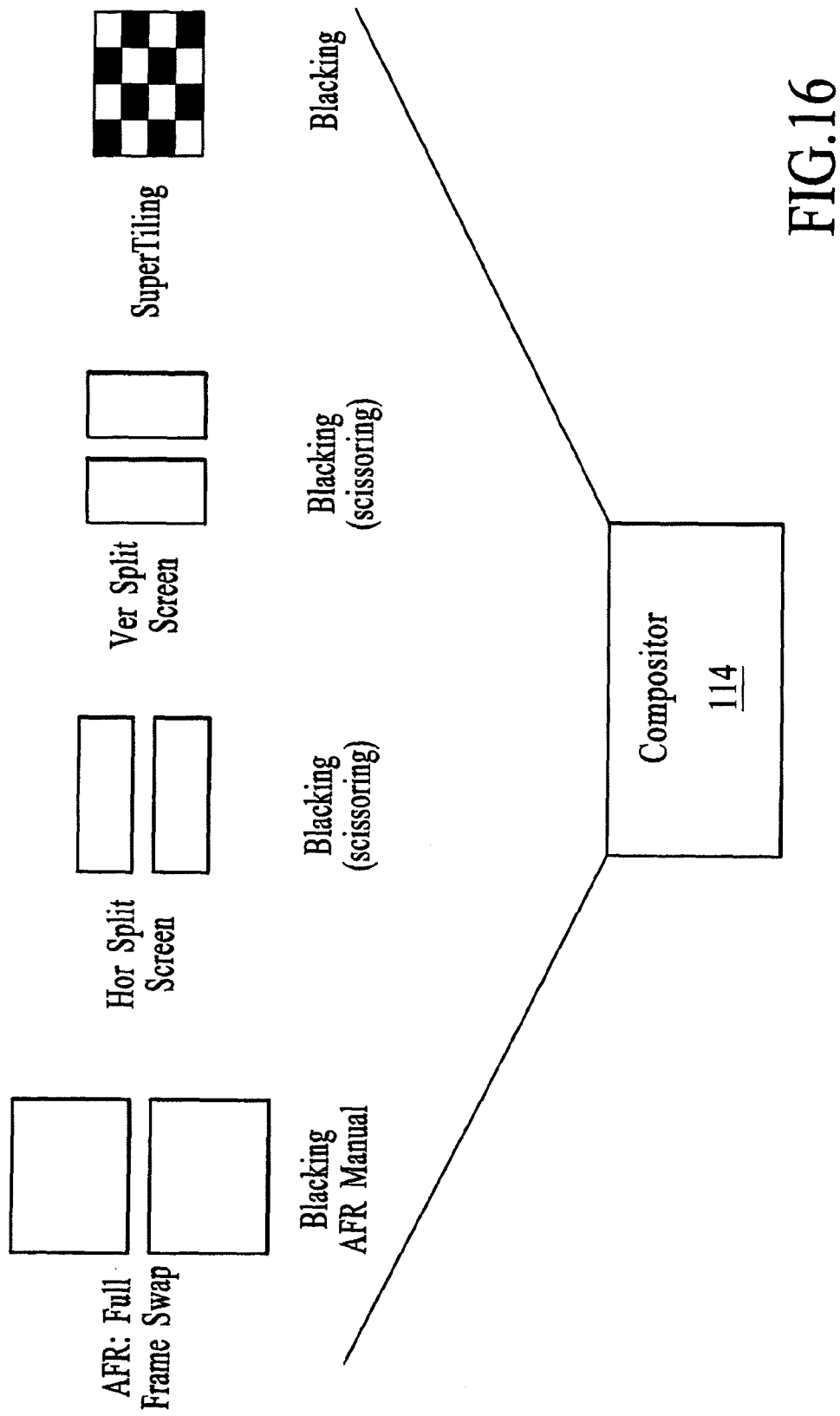
FIG. 16 is a diagram illustrating various load balancing modes according to an embodiment.

"Load balancing" refers to how work is divided by a driver for processing by multiple system VPUs. In various embodiments, the processed data output by each VPU is composited according to one of multiple compositing modes of the IM 1512, also referred to herein as "interlinking modes" and "compositing modes". The IM 1512 supports numerous methods for load balancing between numerous VPUs, including super-tiling, scissoring and alternate frame rendering ("AFR"), all of which are components of "Blacking". These modes are described below. FIG. 16 is a diagram illustrating various load balancing modes performed by the system as described. Frame data from various VPUs in the system is processed according to a load balancing mode and composited in a compositor 114 (for example, as shown in FIG. 1), as described herein, to generate a displayable frame.

For Super-Tiling, software driver control determines the tile size and alternates between image data and black tiles so that, between the master and slave VPUs, each frame is fully painted. The IM 1512 passes through the non-black pixels (image data) creating a super tiling-type split between the master and slave inputs. The tile sizes can be dynamically adjusted every pair of master and slave frames if desired. Super-Tiling may divide a display screen into a chess board pattern for which each square/tile is 32.times.32, pixels for example. The image tiles are rendered on a first VPU of a multi-VPU system while the black tiles are rendered on a second VPU. Super-Tiling provides fine grain load sharing for pixel processing within a frame of rendering, a more even distribution of pixel load relative to other load balancing methods, and less complex driver implementation.

Scissoring divides a display screen into two parts, and this division can be horizontal or vertical. While a horizontal split may be more convenient when considering software implementation and data transfer flexibility, a vertical split may provide better load balancing. In the context of multiple VPUs, scissoring provides optimization opportunities in the direction of parallelizing data transfers with 3D rendering. Scissoring also supports methods in which the slave VPU (which performs the majority of data transfers) does less work than the master VPU, thereby facilitating dynamic load balancing schemes between the master and the slave VPUs.

Scissoring includes both Vertical Split Screen Blacking Control and Horizontal Split Screen Blacking Control. With Vertical Split Screen Blacking Control, the drivers determine which side of a frame are output from the master and slave VPU, so that between the two VPUs every frame is completely painted. The part of a frame that each VPU does not handle is cleared to black by the drivers. The IM 1512 then interlinks the two frames as a vertical split between the master and slave VPU. The split does not have to be an even split of the screen (e.g., 50% rendered by each VPU) and can be dynamically adjusted for every pair of master and slave frames.

Under Horizontal Split Screen Blacking Control, the software drivers determine which upper or lower section of a frame are output from the master and slave VPU. The drivers then clear to black the portions that will not hold valid frame buffer data and the IM 1512 mixes the inputs as a horizontal split of the inputs. The split does not have to be an even split of the screen (e.g., 50% rendered by each VPU) and can be dynamically adjusted for every pair of master and slave frames.

Alternate Frame Rendering ("AFR") performs load balancing at a frame level. A "frame" as referred to herein includes a sequence of rendering commands issued by the application before issuing a display buffer swap/flip command. AFR generally passes each new frame through to the output from alternating inputs of the IM 1512. One VPU renders the even-numbered frames and the other VPU renders the odd-numbered frames, but the embodiment is not so limited. The AFR allows performance scaling for the entire 3D pipeline, and avoids render-to-texture card-to-card data transfers for many cases.

The IM 1512 of an embodiment may perform AFR under Manual Control, Manual Control with automatic VSync switching, or Blacking Control. When using Manual Control, the drivers manually select an input of the IM 1512 for a frame after the next VSync. Using AFR using Manual Control with VSync switching, and following a next vertical blank, the IM 1512 chooses the input coupled to the master VPU as the output source and then automatically toggles between the master and slave VPU inputs on every VSync. Using Blacking Control, the drivers alternate sending a fully painted frame versus a cleared-to-black frame from the master and slave VPUs; the IM 1512 toggles between the master and slave frames as a result.

Other compositing strategies are available and are not limited by the IM 1512. For example, extended interlink modes are also available that go beyond the load sharing usage of the Manual AFR and Blacking modes. These modes, while not the standard interlinking used for pure speed gains by sharing the processing between multiple VPUs, enhance the system quality and/or speed by offloading functionality from the VPUs to the IM 1512. As one example of an extended mode, the IM 1512 of an embodiment supports the "SuperAA" mode previously referred to in addition to the Manual AFR and Blacking modes.

Referring again to FIG. 15, the IM 1512 supports multiple input modes and single or dual link TMDS widths, depending on the input connectivity. The IM 1512 also includes counters that monitor the phase differences between the HSyncs and VSyncs of the two inputs. The counters may include a pixel/frame counter to assist in matching the clocks on the two input streams.

Referring to Table 5, in one embodiment, the IM 1512 has three counters 1510. Each counter increments the master pixel clock and uses one of the VSyncs for latching and clearing.

If a read of an I2C counter is occurring, the update to that register is held off until after the read is completed. If a write of the register is occurring, then the read is delayed until the write is completed. Read delays are only a few IM internal clocks and therefore are transparent to software.

TABLE 5

IM Counters

| Counter Name | Bits | Clock | Description |
| --- | --- | --- | --- |
| CLKS_PER_FRAME_CTR | 22 | Master Pixel | Number of master clocks per 1 slave frame uses slave VSync to determine frame edges every slave VSync latches the count to CLKS_PER_FRAME and resets this counter |
| S2M_VSYNC_PHASE_CTR | 11 | Master Pixel | Number of lines displayed between slave VSync and master VSync latched to S2M_VSYNC_PHASE every master VSync resets the count to 0 every slave VSync |
| S2M_HSYNC_PHASE_CTR | 12 | Master Pixel | Number of pixels displayed between slave HSync and master HSync latched to S2M_HSYNC_PHASE every master HSync resets the count to 0 every slave HSync |

The IM 1512 may be used in a number of configurations as described above. In one configuration, referred to herein as a "dongle", the IM 1512 receives two separate TMDS outputs, one each from two separate VPUs, and brings them onto the dongle through two TMDS receivers. The separate receivers then output two DVO streams directly into the IM 1512 of the dongle. The IM 1512 mixes the two received inputs into a single output stream. The output DVO signals from the IM 1512 are then, fed either to a TMDS transmitter or through a DAC, both of which drive out through a standard DVI-I connector on the dongle.

In another configuration, referred to herein as an "on-card" configuration, the IM 1512 receives two streams of DVO signals directly from two VPUs that reside on the same card as the IM 1512. This on-card configuration does not use TMDS transmitters or receivers between the VPUs and the IM 1512, in contrast to the dongle configuration. The IM 1512 mixes the two received inputs into a single output stream. The output DVO signals from the IM 1512 are then fed either to a TMDS transmitter or through a DAC, both of which drive out through a standard DVI-I connector for example.

The input streams received at the IM 1512 inputs are referred to herein as the "master input" and the "slave input", and are received from the master and slave VPUs, respectively. The master and slave VPUs may be on two separate cards or on a single "super" card. Either VPU can function as the master or slave VPU.

The master VPU is used as the primary clock to which the slave is synchronized ("synced"). The master clock is not adjusted or tuned other than the normal card initialization process. The slave VPU is adjusted to run slightly ahead of the master VPU to allow for synchronization and FIFO latencies. The slave VPU uses a larger FIFO in order to compensate for variances between the pixel clock rates of the two VPUs, while the master VPU path uses a shallow FIFO only to synchronize the master input clock domain to the internal DVO clock domain. Flow control between the master and slave VPUs includes initial synchronization of the two VPUs and then ongoing adjustments to the slave VPU to match the master VPU. The flow control includes clock adjustments via a pixel hold off signal generated by the IM 1512 or driver action in response to counters within the IM 1512.

The IM 1512 as described above supports numerous operational modes, including Pass-through Mode and various Interlink Modes, as illustrated in Table 1. These operational modes are set through a combination of I2C register bits and the TMDS Control Bits as described herein.

Pass-through Mode is a mode in which an input of the IM 1512 is passed directly through to the output (monitor). The input port used is chosen at power-up by the initial toggling of an I2C clock. The path can be changed again by switching the ENABLE_INTERLINK register from "1" back to "0" and then toggling the I2C clock of the desired port.

Interlink Modes include numerous modes in which the IM 1512 couples inputs received from the master and slave VPUs to an output in various combinations. Dual VPU Interlink Modes of an embodiment include but are not limited to Dual AFR Interlink Mode and Dual Blacking Interlink Mode.

Dual VPU Interlink Modes are modes in which both VPUs are being used through manual AFR control or through blacking modes. Both IM 1512 ports are output continuously during operations in these modes.

Dual AFR Interlink Mode includes modes in which the source of the IM 1512 output is alternated between the two input ports. It can either be done manually by the IM 1512 drivers or automatically once started based on VSync. Control of the Dual AFR Interlink Mode includes use of the following bits/states: AFR_MAN_ON*=low; AFR_AUTO*=high or low; AFR_MAS (used to control which card is outputting at the time or to set the first card for the Auto switch).

Figure 17:
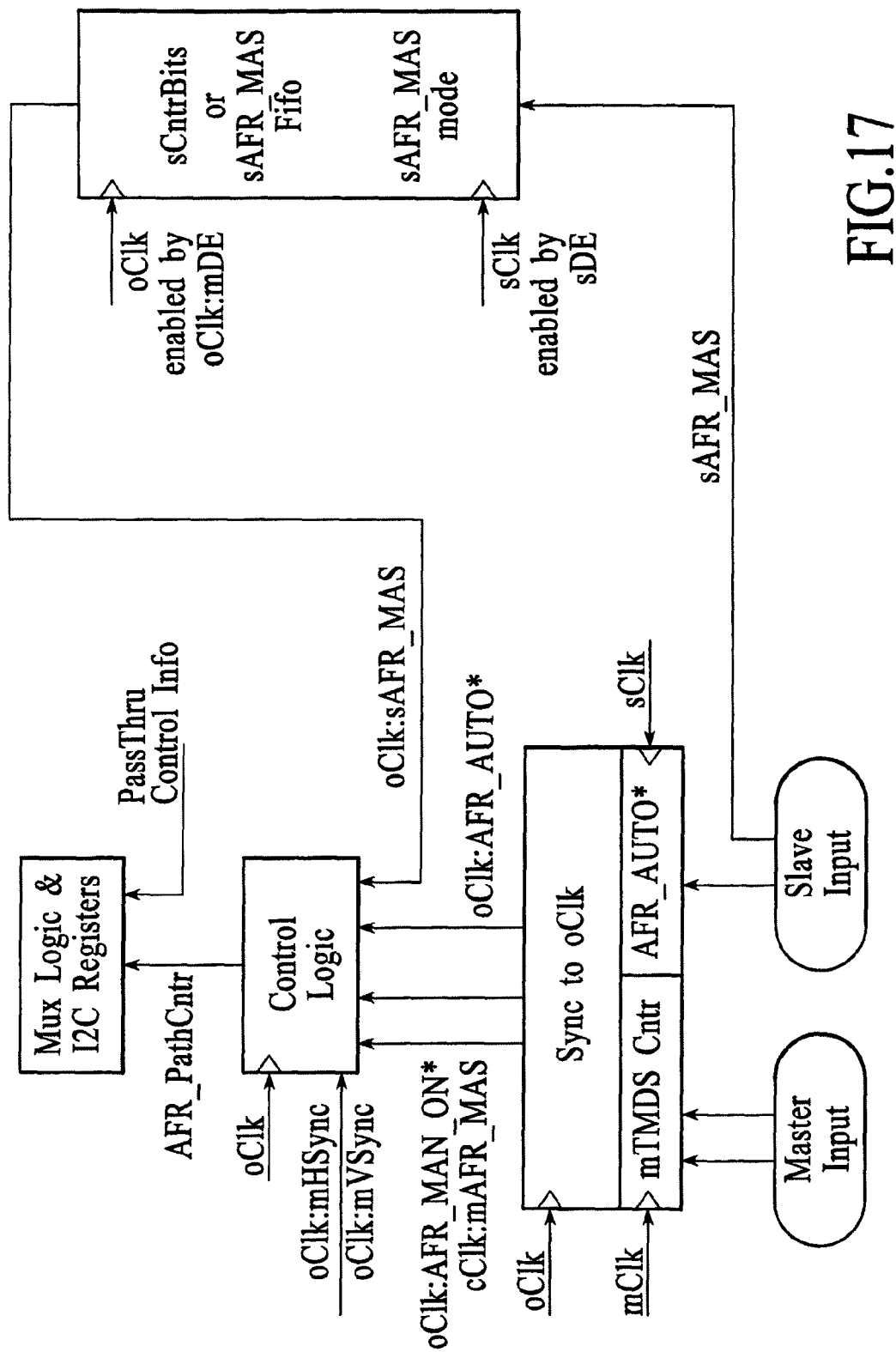
FIG. 17 is a block diagram of path control logic of an interlink module (IM) according to an embodiment.

FIG. 17 shows path control logic of the IM. oClk is the output pixel clock. It is generated in slave passthru directly from the sClk from the slave port. In interlink or master pass-through modes, it is generated directly from the mClk from the master port with the same timings. oClk:mDE is simply the master port's mDE signal synchronized into the oClk time domain.

Dual Blacking Interlink Mode includes modes in which both VPUs output in parallel and the IM 1512 forms an output by selecting pixels on a pixel-by-pixel basis by transmitting black pixel values for any pixel of any VPU that should not be output. Control of the Dual Blacking Interlink Mode includes use of the following bit/state: AFR_MAN ON*=high.

AFR_MAN_ON* is sent across the master TMDS Control Bit bus on bit no 2. It is clocked in with mClk, one clock before the rising edge of mDE after the rising edge of mVSync. The action in response to it takes place before the first pixel of this mDE active period hits the MUX. Other than this specific time, there is no direct response to AFR_MAN_ON*.

When AFR_MAN_ON* is active (LOW) and ENABLE_INTERLINK is set to 1 and the ExtendedModes bit is 0, then the path set by the pixel MUX is controlled by the xAFR_MAN bits as described below.

The I2C register reflects the result after the resulting action occurs. It does not directly reflect the clocked in bit.

AFR_AUTO* is sent across the slave TMDS Control Bit bus on bit no 2. It is clocked in with sClk timings and then synced to mClk. It is latched in the clock before mDE goes high after the rising edge of mVSync. The action in response to it then occurs before the first pixel associated with the active mDE hits the MUX and only if AFR_MAN_ON* is low on the same latching point.

When AFR_AUTO* and AFR_MAN_ON* are active and ENABLE_INTERLINK is set to 1 and extended interlink modes are not active, then the path set by the pixel MUX is initially set to the master path. The path is then automatically toggled on every rising edge of mDE after the rising edge of mVSync until AFR_AUTO* is deasserted.

The I2C register reflects the result after the resulting action occurs. It does not directly reflect the clocked in bit.

The mAFR_MAS is set from the master port on mLCTL[1] and sAFR_MAS is set from the slave port on sLCTL[1]. These two bits control which path is set by the pixel MUX when in Interlink mode, manual AFR control.

The mAFR_MAS is clocked directly in with mCLK. The sAFR_MAS is clocked in with sCLK and then synced to mCLK. The bits are latched on the rising clock edge before the rising edge of mDE. Both latched bits then go into a logic block which detects a bit changing state. Depending on an I2C register bit, either after the rising edge of a VSync or an HSync, if a bit is detected as having its state changed, the logic sets the pixel MUX when in AFR_MANUAL Interlink mode to match the path of the toggled bit. The MUX will not change during AFR_MANUAL interlink mode at any other time.

If both bits toggle in the same updating time frame, then the master path is set.

Unlike the other control bits, the I2C register reflects the individual synchronized bits going into the MUX control logic block clocked in with MClk and not the bits after the sync state.

Regarding data and control paths in the IM 1512 of an embodiment, the Dual VPU Interlink Mode works in routing modes that include pass-through, dual/single input AFR Manual interlink, and dual input Blacking Interlink. These routing modes describe which of the data and control lines from the two receivers get transmitted out of the IM 1512 via the transmitter or DAC. Table 6 shows the data, control, and clock routing by routing mode of the IM 1512, under an embodiment.

The clock is the pixel clock, the internal control lines are the lines that connect between the TMDS transmitter and receivers (and IM 1512), and the external control lines are lines that are not processed by the TMDS circuitry such as I2C and Hot Plug. The Slave pixel hold off signal goes directly between the IM 1512 and the Slave DVI VSync pin.

TABLE 6

| Routing Mode | Clock | Internal Control | ByPass Control | Data | Notes |
|---|---|---|---|---|---|
| Pass-Through | Master or Slave | Master or Slave | Master or Slave | Master or Slave | set by first I2C clock toggling |
| AFR Manual | Master or Slave | Master or Slave | Master or Slave | Master or Slave | set by AFR_MAN control bit |
| Blacking | Master | Master | Master | Master and Slave | Data is interlinked depending on black pixels |

Pass-Through occurs when using the IM 1512 in single-VPU Mode and before the drivers set up the IM 1512 and VPUs for the dual-VPU mode. At power up, the IM 1512 defaults the MUX to pass all data and control lines directly from the master VPU to the output of the IM 1512. As soon as the IM 1512 sees one of the input TMDS I2C clocks toggling, it sets the MUX to pass that specific channel to the output. This includes the clock and all control signals, whether it is from the master or slave VPU. This allows the IM 1512 to connect the default video card of the system directly through to the monitor during power-up BIOS operation, even before the drivers are aware of existence of the IM 1512.

In the Dual VPU Interlink Mode, once the drivers are loaded, the drivers can detect if the IM 1512 exists and if there are one or two connections to the IM 1512. The detection is done by reading the I2C ID register of the IM 1512 through the port of each VPU. The drivers can determine which discovered connection is the master and which is the slave by the value of bit 0 of the IM 1512 ID register read on each port.

If only one connection is found, the IM 1512 is left in Pass-through mode. If two connections are found to the IM 1512, the driver then takes over the screen control, setting the MUX of the IM 1512 to output from the master port, with the VPU connected to the master port as the master VPU. The clock is driven from this port until the power is lost or one of the input connections to the IM 1512 is broken.

The MUX of an embodiment is set by mechanisms that include Pass-Through initial states, AFR Manual Control, and Blacking Control. These modes and the particular controls for each are set through the TMDS CNTR bits, with the IM 1512 responding on the next vertical blanking period. The master/slave switch (AFR_MAS) can latch in/occur on either the next HSync or the next VSync depending on the I2C control bits setting.

In addition to using TDMS control registers, the drivers also control and monitor the IM functionality using I2C control registers.

I2C registers are used for control and monitoring that does not need to happen every frame or faster. The registers can be available through both the master and slave ports of the IM.

For more dynamic control, the I2C control registers are used to set different multiVPU modes and to manually switch the IM data path.

In one embodiment of a video processing system, inter-integrated circuit communication for the IM is accomplished using an Inter-Integrated Circuit (I2C) bus. I2C is a bus typically used to connect integrated circuits (ICs). I2C is a multi-master bus, which means that multiple ICs can be connected to the same bus and each one can act as a master by initiating a data transfer.

Figure 18:
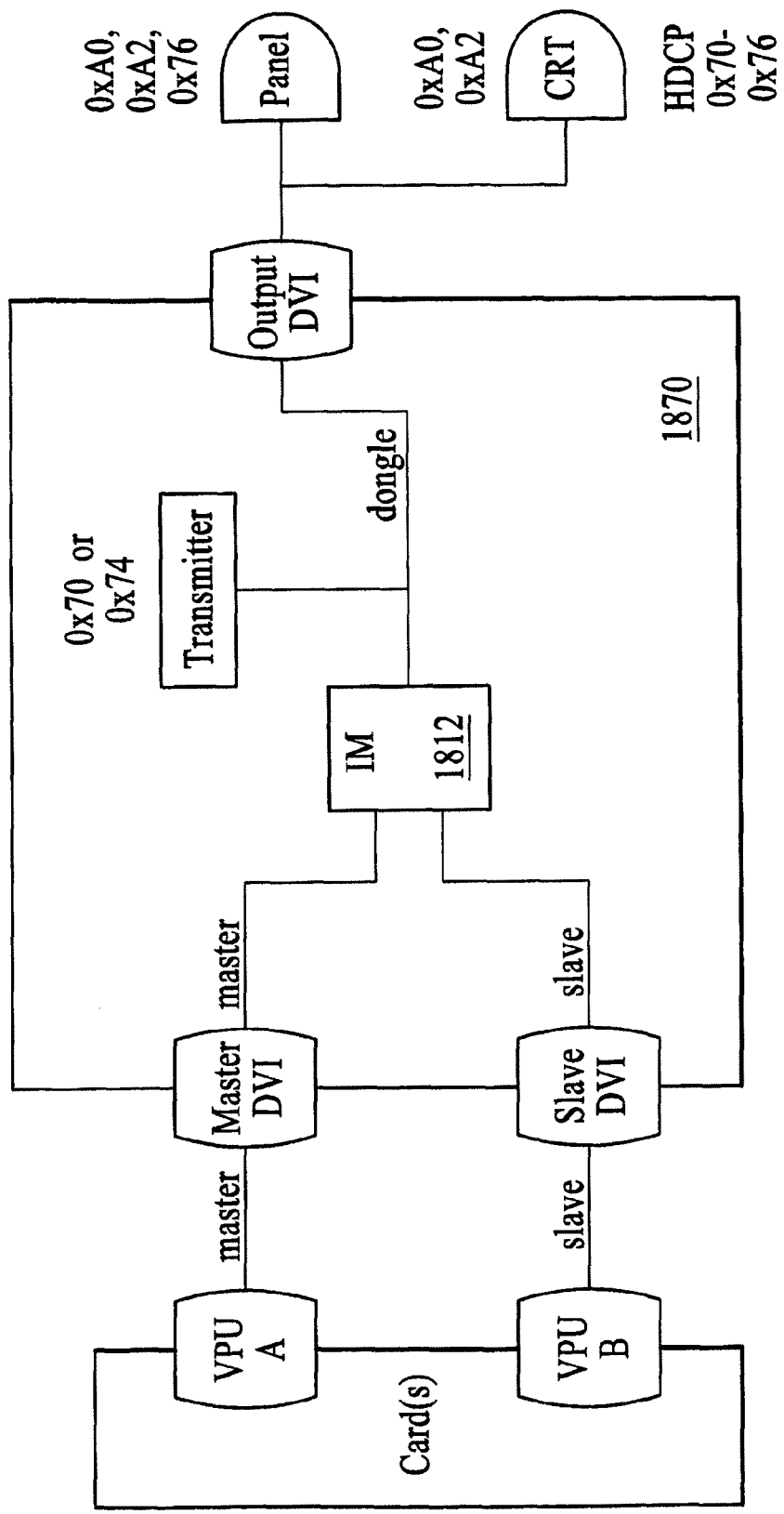
FIG. 18 is a block diagram of I2C paths according to a dongle embodiment.

FIG. 18 is diagram of an embodiment of an IM 1812 on a dongle 1870, showing various I2C paths. The dongle 1870 receives data from a master VPU A and a slave VPU B. In an embodiment, the master VPU A and the slave VPU B reside on one or more VPU card(s). In an embodiment, there are three separate I2C buses for the IM 1812. There is an I2C bus from each of two input ports, a master input port and a slave input port. A third I2C bus goes from the IM 1812 to a transmitter, and to any connected output device, such as panel and/or cathode ray tube (CRT).

The two input I2C buses each feed through the DVI master and slave input ports into the dongle 1870 and directly into the IM 1812 on two separate channels.

Figure 19:
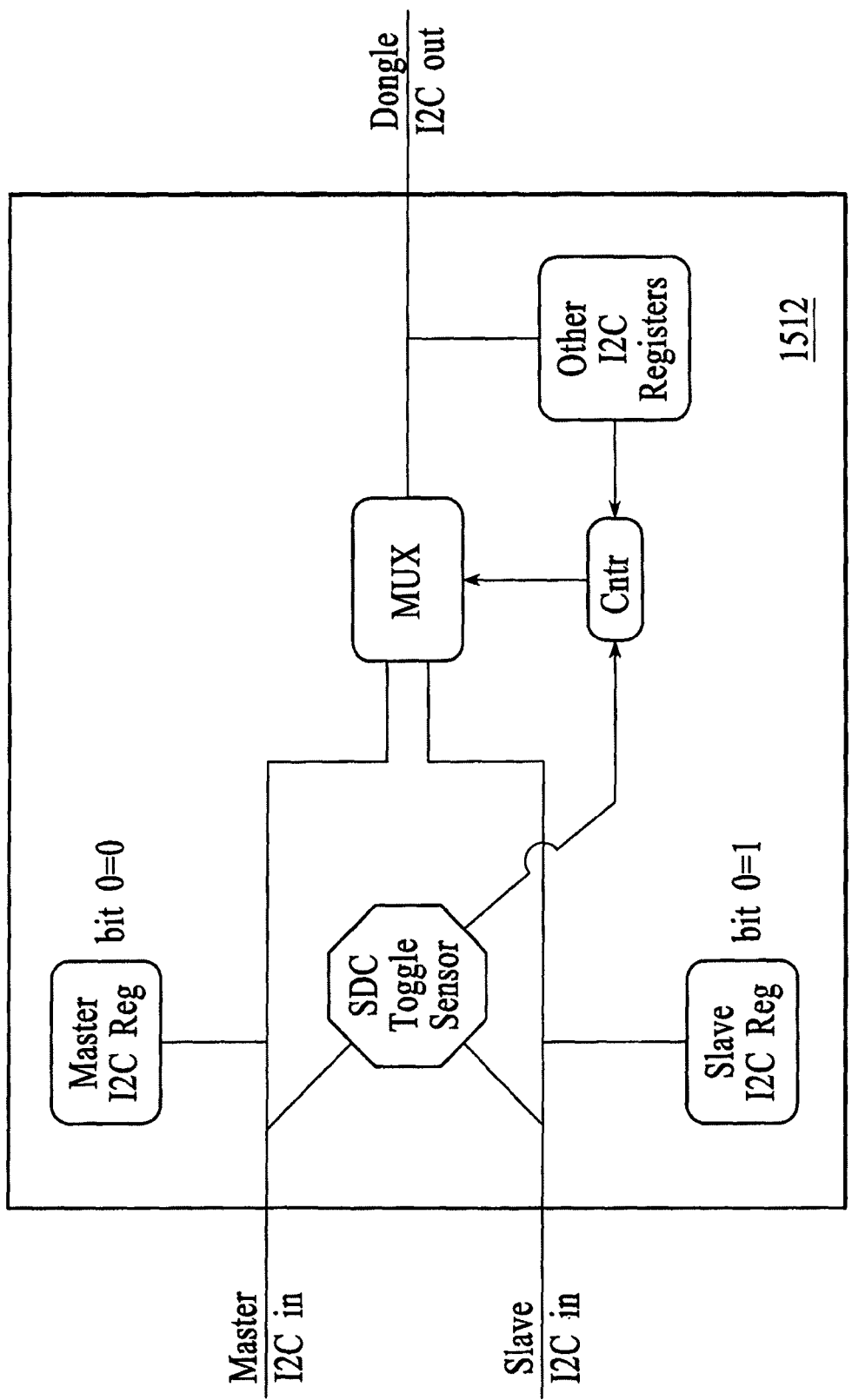
FIG. 19 is a block diagram of I2C paths of an interlink module (IM) according to an embodiment.

FIG. 19 is a diagram of I2C paths within the IM 1512 according to an embodiment. The IM 1512 includes a master identification (ID) I2C register and a slave ID I2C register. The IM 1512 further includes an SDC toggle sensor, a MUX, and other I2C registers.

Either of VPU A or VPU B can access the ID registers directly through respective input ports without concern for I2C bus ownership.

The IM 1512 has one set of registers which are I2C accessible at a particular I2C device address. All other addresses are passed through the IM 1512 onto the I2C output port.

The master ID register and the slave register each have the same internal address, but are accessible only from their own respective I2C buses (slave or master).

Other than an IM_xxx_ID registers (offset 0) and the I2C_Reset register, the I2C bus is arbitrated on an I2C cycle-by-cycle basis, using a first-come, first-served arbitration scheme.

For read cycles of the multi-byte registers, the ownership is held until the last byte is read. Software drivers insure that all bytes are fully read in the bottom to top sequence. If all bytes are not fully read in the bottom to top sequence, the bus may remain locked and the behavior may become undefined.

For accesses that are passed through the IM 1512 to external devices, the IM 1512 does not understand page addressing or any cycle that requires a dependency on any action in a prior access (cycles that extend for more than one I2C stop bit). Therefore a register bit (CONTROL-BITS_2: Bit 0: I2C_LOCK) is added. The software sets this register bit if a multi-I2C access is needed. When this register bit is set, the bus is given to that port specifically until the bit is unset, at which time the automatic arbitration resumes. In a case where both ports try to set this bit, then the standard arbitration method determines which gets access, and a negative acknowledgement (NACK) signal is sent to let the requester know it was unsuccessful.

A specific I2C_Reset register is used in a case of the I2C bus becoming locked for some unexpected reason. Any read to this register, regardless of I2C bus ownership, will always force the I2C state machines to reset and free up the I2C bus ownership, reverting back to the automatic arbitration.

For the other I2C registers, the I2C bus ownership is dynamically arbitrated for on a first-come, first-served fashion. The input port accessing the other registers first with a clock and start bit gets ownership for the duration of the current I2C cycle (that is, until the next stop bit). For multiple-byte read registers (counters) on the IM 1512, the ownership is maintained from the first byte read until the final byte of the register has been read.

If an I2C access starts after the bus has been granted to another input port, then a negative acknowledgement (NACK) signal is sent in response to the access attempt. The data for a read is undefined and writes are discarded.

The IM 1512 supports single non-page type I2C accesses for accesses off of the IM 1512. To allow for locking the I2C bus during multiple dependent type I2C cycles, if an input port sets an I2C_LOCK bit (I2C_CONTROL_2: bit 0) to 1, the I2C bus is held in that port's ownership until the same port sets the same bit back to 0. This register follows the same first-come, first-served arbitration protocol.

If the I2C_RESET register is read from either port (no arbitration or ownership is required), then the I2C state machine is reset and any I2C ownerships are cleared.

Figure 20:
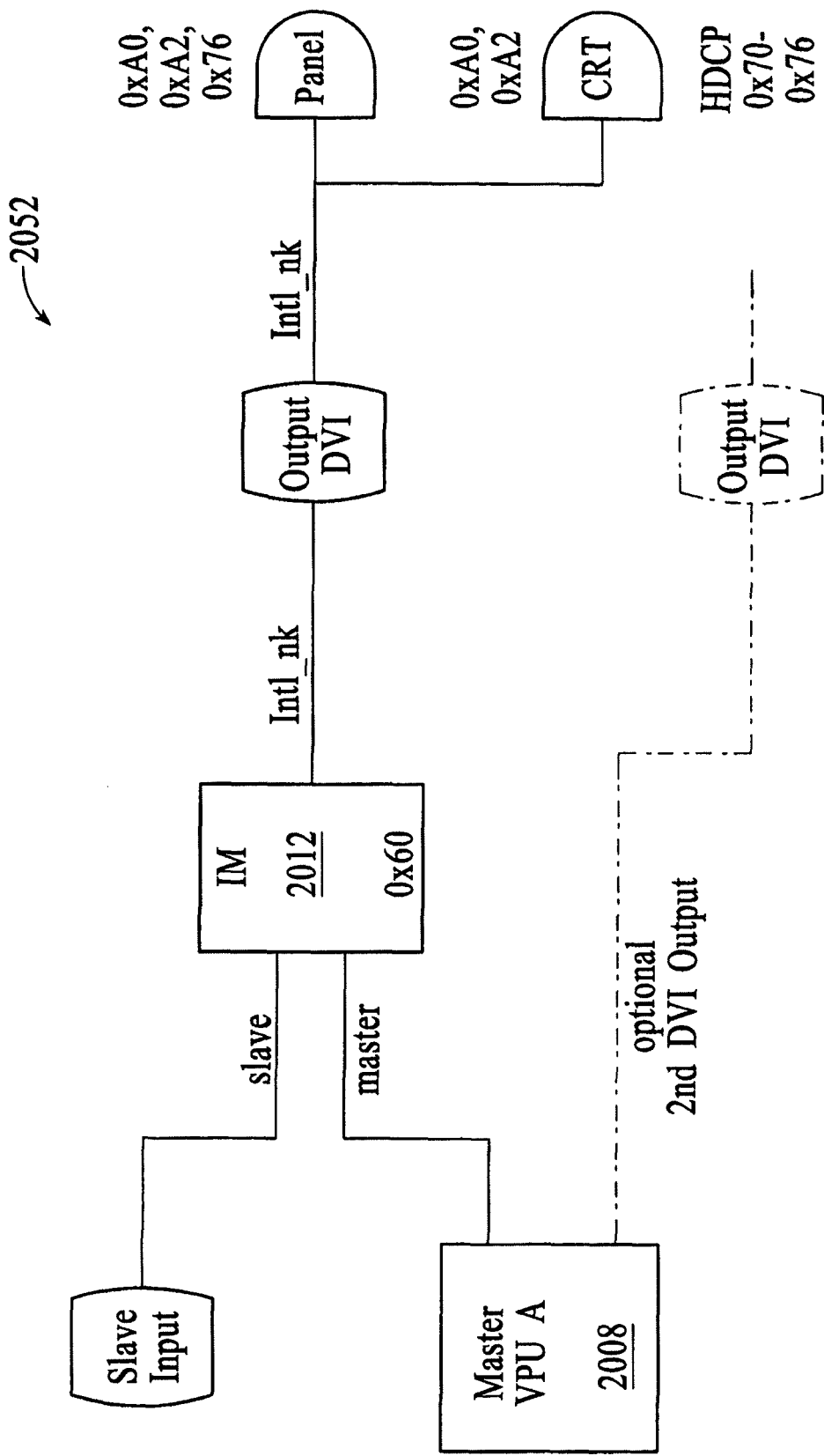
FIG. 20 is a block diagram of I2C paths on a VPU card according to an embodiment.

FIG. 20 is a diagram of I2C bus paths for a configuration in which a master VPU A and an IM 2012 are on the same VPU card 2052 according to an embodiment. The VPU card 2052 could be part of the system of FIG. 11, for example. The VPU card 2052 includes a master VPU 2008, an IM 2012, a DVI transmitter and optional DVI transmitter. There are three I2C buses (master, slave, and interlink), as shown entering and existing the IM 2012. In one embodiment, the interlink I2C bus is a continuation of the master I2C bus or slave I2C bus, depending on which bus is first accessed.

All IM 2012 12 C registers are available to either the slave or master I2C ports. Standard NACK responses are used if the I2C bus is currently in use by the other path. An IM 2012 device ID is an exception and can be accessed by either port at the same time.

In order to optionally verify that an I2C cycle has completed successfully, all write registers are readable back. Since the I2C registers on the IM 2012 do not time out, this matches the current method of I2C accesses used on various conventional video cards. The read back should not be necessary to verify writes.

The IM 2012 I2C resets its state machine (not shown) every time it gets a stop bit. This occurs at the start and end of every I2C cycle, according to known I2C protocol.

A CONTROL_ONESHOTS register (not shown) has a different behavior from the other read/write registers. Once written to, the IM 2012 latches its results to internal control bits. The CONTROL_ONESHOTS registers themselves are cleared on the next read of this register (allowing for confirmation of the write).

The internal copies of the CONTROL_ONESHOTS bits are automatically cleared by the IM 2012 once the IM 2012 has completed the requested function and the CONTROL_ONESHOTS register corresponding bits are cleared. The IM 2012 does not re-latch the internal versions until the I2C versions are manually cleared.

The IM has one set of registers which are I2C accessible. The IM_MASTER_ID and IM_SLAVE_ID registers have the same internal address but are accessible only from their own I2C bus (e.g., slave or master).

The rest of the registers are only accessible from one side (master or slave) at a time.

In order to verify that an I2C cycle has completed successfully, all write registers must also be readable back to verify the updated values. Since the I2C registers on the IM do not time out, this is consistent with conventional methods of I2C accesses used on various existing video cards. If needed, the read back should not be necessary to verify the writes.

The IM I2C also resets its state machine every time it gets a stop bit. This happens as per I2C protocol at the start and end of every I2C cycle.

The CONTROL_ONESHOTS register has a different behavior from the other read/write registers. Once written to, the IM latches its results to internal control bits. The CONTROL_ONESHOTS are cleared on the next read of this register (allowing for confirmation of the write).

The internal copies of the CONTROL_ONESHOTS bits are automatically cleared by the IM once the IM has completed the requested function and the CONTROL_ONESHOTS register corresponding bits are cleared.

In a dongle configuration, such as in FIGS. 13 and 14, for example, the TMDS control bits are transmitted through the TMDS interface into the IM. The software (driver) sets the registers within the VPU for the desired control bit values and the results arrive at the TMDS receivers on the dongle and are latched into the IM. The AFR_MAN_ON* and AFR_AUTO* are latched on the rising edge of the TMDS VSync. No pixel data is being transmitted at this time. AFR_MAS is latched in on the rising edge of either HSync or VSync, depending on the setting in the I2C Control_Bits register, bit 5.

If the interlink_mode is not enabled (I2C register set), then the bits will be ignored until it is enabled and will take place on the next VSync.

If the interlink_mode is enabled, then the affect occurs on the very next pixel data coming out of the IMs after the VSync or HSync as is appropriate.

If in pass-through modes, the Syncs used are from the active path. If in AFR_MANual or blacking interlink modes, then the Syncs used are always from the master path.

Aspects of the invention described above may be implemented as functionality programmed into any of a variety of circuitry, including but not limited to programmable logic devices (PLDs), such as field programmable gate arrays (FPGAs), programmable array logic (PAL) devices, electrically programmable logic and memory devices and standard cell-based devices, as well as application specific integrated circuits (ASICs) and fully custom integrated circuits. Some other possibilities for implementing aspects of the invention include: microcontrollers with memory (such as electronically erasable programmable read only memory (EEPROM)), embedded microprocessors, firmware, software, etc. Furthermore, aspects of the invention may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. The teachings of the invention provided herein can be applied to other systems, not only for the system including graphics processing or video processing as described above.

For example, a video image produced as described herein may be output to a variety of display devices, including computer displays that display moving pictures and printers that print static images.

The various operations described may be performed in a very wide variety of architectures and distributed differently than described. As an example, in a distributed system a server may perform some or all of the rendering process. In addition, though many configurations are described herein, none are intended to be limiting or exclusive. For example, the invention can also be embodied in a system that includes an integrated graphics processor (IGP) or video processor and a discrete graphics or video processor that cooperate to produce a frame to be displayed. In various embodiments, frame data processed by each of the integrated and discrete processors is merged or composited as described. Further, the invention can also be embodied in a system that includes the combination of one or more IGP devices with one or more discrete graphics or video processors.

In other embodiments not shown, the number of VPUs can be more than two.

In other embodiments, some or all of the hardware and software capability described herein may exist in a printer, a camera, television, handheld device, mobile telephone or some other device. The video processing techniques described herein may be applied as part of a process of constructing animation from a video sequence.

The elements and acts of the various embodiments described above can be combined to provide further embodiments. These and other changes can be made to the invention in light of the above detailed description.

The U.S. patent application cited herein is hereby incorporated by reference in its entirety.

In general, in the following claims, the terms used should not be construed to limit the video processing method and system to the specific embodiments disclosed in the specification and the claims, but should be construed to include any processing systems that operate under the claims to provide video processing. Accordingly, the video processing method and system is not limited by the disclosure, but instead the scope of the video processing method and system is to be determined entirely by the claims.

While certain aspects of the method and apparatus for video processing are presented below in certain claim forms, the inventors contemplate the various aspects of the method and apparatus for video processing in any number of claim forms. For example, while only one aspect of the method and apparatus for video processing may be recited as embodied in computer-readable medium, other aspects may likewise be embodied in computer-readable medium. Accordingly, the inventors reserve the right to add additional claims after filing the application to pursue such additional claim forms for other aspects of the method and apparatus for video processing.

What is claimed is:

1. A multiprocessor system, comprising:
   a plurality of command buffers; and
   a plurality of special purpose processors that perform different portions of a related processing task;
   wherein a set of commands that cause each of the processors to perform the portions of the related task are distributed among the command buffers, and
   wherein the set of commands comprise a predicated execution command that precedes other commands within the set of commands, the predicated execution command including a processor select bit field used to determine whether commands that follow the predicated execution command should be processed and executed by a particular one of the processors, or whether a number N of the commands that follow the predicated execution command should be ignored, where N is programmed into a packet header.

2. The multiprocessor system of claim 1, wherein the predicated execution command comprises an identification of each processor to execute a command.

3. The multiprocessor system of claim 1, wherein the predicated execution command comprises the number of commands that are to be executed by each processor.

4. A multiprocessor system comprising:
   a plurality of processors each configurable to receive a set of commands that directs the processor to perform a task; and
   at least one driver configurable to build a command buffer comprising the set of commands such that each of the plurality of processors receives the same command buffer, and each processor performs different portions of the task, wherein the set of commands comprise a predicated execution command that precedes other commands within the set of commands, wherein the predicated execution command includes a processor select bit field used to determine whether commands that follow the predicated execution command should be processed and executed by a particular one of the processors, or whether a number N of the commands that follow the predicated execution command should be ignored, where N is programmed into a packet header.

5. The multiprocessor system of claim 4, wherein the plurality of processors comprise video processing units (VPUs) and wherein the task comprises a rendering task.

6. The multiprocessor system of claim 4, wherein each of the plurality of processors comprises a command processor (CP) including an unique execution engine microcode image for each processor that includes information distinguishing each processor from other processors.

7. The multiprocessor system of claim 6, wherein if one of the plurality of processors is not to execute a number of commands, the processor skips the number of commands in the set of commands.

8. The multiprocessor system of claim 6, wherein each processor's CP determines whether a sequence of commands in the set of commands and data is relevant to the processor, and wherein each processor's CP processes relevant commands and ignores irrelevant commands.

9. The multiprocessor system of claim 6, wherein the information includes a device identification.

10. The multiprocessor system of claim 4, wherein the predicated execution command comprises an identification of each processor to execute a command.

11. The multiprocessor system of claim 4, wherein the predicated execution command comprises the number of commands that are to be executed by each processor.

12. The multiprocessor system of claim 4, further comprising a user interface for programming the system to perform in one or more of a plurality of modes, wherein the plurality of modes comprise compositing modes for compositing results of different portions of the tasks, modes of task sharing, modes of load balancing, and modes of antialiasing.

13. A multiple video processing unit (VPU) processing method, comprising:
 forming a single command buffer that includes commands for each of the multiple VPUs, wherein the commands relate to a task to be shared by the multiple VPUs, and wherein the single command buffer is formed so as to be interpreted individually by each of the multiple VPUs;
 making the single command buffer available to each of the multiple VPUs concurrently so that each of the multiple VPUs concurrently executes respective commands in the single command buffer;
 wherein the set of commands comprise a predicated execution command that precedes other commands within the set of commands, the predicated execution command including a VPU select bit field used to determine whether commands that follow the predicated execution command should be processed and executed by a particular one of the VPUs, or whether a number N of the commands that follow the predicated execution command should be ignored, where N is programmed into a packet header.

14. The method of claim 13, further comprising forming the command buffer to cause a selected one of the multiple VPUs to execute particular commands based on a plurality of factors, including an operating mode.

15. The method of claim 13, wherein if one of the plurality of VPUs is not to execute a number of commands, the VPU skips the number of commands in the set of commands.

* * * * *